US010262128B2

(12) United States Patent
Bomar et al.

(10) Patent No.: US 10,262,128 B2
(45) Date of Patent: *Apr. 16, 2019

(54) TOKENIZED DATA SECURITY

(71) Applicant: SABRE GLBL INC., Southlake, TX (US)

(72) Inventors: Kevin B. Bomar, Weatherford, TX (US); Glenn E. Harper, Grapevine, TX (US)

(73) Assignee: Sabre GLBL Inc., Southlake, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 14/046,098

(22) Filed: Oct. 4, 2013

(65) Prior Publication Data

US 2014/0041018 A1 Feb. 6, 2014

Related U.S. Application Data

(63) Continuation of application No. 12/973,751, filed on Dec. 20, 2010, now Pat. No. 8,595,812.

(60) Provisional application No. 61/288,102, filed on Dec. 18, 2009.

(51) Int. Cl.
| | |
|---|---|
| *G06F 21/45* | (2013.01) |
| *G06F 21/33* | (2013.01) |
| *G06Q 20/10* | (2012.01) |
| *G06Q 20/20* | (2012.01) |
| *G06Q 20/34* | (2012.01) |
| *G06Q 20/38* | (2012.01) |
| *G06Q 30/06* | (2012.01) |

(52) U.S. Cl.
CPC ............ *G06F 21/45* (2013.01); *G06F 21/335* (2013.01); *G06Q 20/10* (2013.01); *G06Q 20/20* (2013.01); *G06Q 20/34* (2013.01); *G06Q 20/385* (2013.01); *G06Q 30/06* (2013.01); *G06F 2221/2105* (2013.01); *G06F 2221/2145* (2013.01)

(58) Field of Classification Search
CPC ......... G06F 21/45; G06F 21/335; H04L 63/20
See application file for complete search history.

(56) References Cited

U.S. PATENT DOCUMENTS

| | | | |
|---|---|---|---|
| 5,414,841 A | | 5/1995 | Bingham et al. |
| 6,427,151 B1 | * | 7/2002 | Chan et al. |

(Continued)

OTHER PUBLICATIONS

Office Action for U.S. Appl. No. 12/973,725; dated Sep. 9, 2013.
(Continued)

*Primary Examiner* — Samson B Lemma
*Assistant Examiner* — Carlos E Amorin
(74) *Attorney, Agent, or Firm* — Baker Botts L.L.P.

(57) ABSTRACT

Various devices, methods, systems, and computer readable storage are provided for tokenizing data. In some examples, credit card numbers are tokenized using a pre-generated token map and absent the use of a networked database that stores a relatively large quantity of credit card numbers in a central location. The token map may be generated by a token map generator such that the token map can be used by a tokenizer to replace a portion of an account number with a token, and by a detokenizer to replace the token with the original portion of the account number. A pre-parser and parser may also be used to locate an account number and/or token in a message received over a network.

20 Claims, 17 Drawing Sheets

(56) References Cited

U.S. PATENT DOCUMENTS

| | | | |
|---|---|---|---|
| 6,799,246 B1* | 9/2004 | Wise | G06F 12/0207 710/53 |
| 7,770,789 B2 | 8/2010 | Oder, II et al. | |
| 8,578,176 B2* | 11/2013 | Mattsson | G06F 21/6218 713/193 |
| 2002/0120854 A1 | 8/2002 | LeVine et al. | |
| 2005/0182946 A1* | 8/2005 | Shatford | 713/185 |
| 2006/0036593 A1* | 2/2006 | Dean | G06F 17/3061 |
| 2007/0113170 A1* | 5/2007 | Dignum | G06F 17/2247 715/239 |
| 2007/0113171 A1* | 5/2007 | Behrens | G06F 15/7842 715/239 |
| 2007/0113172 A1* | 5/2007 | Behrens | G06F 17/2229 715/239 |
| 2007/0113222 A1* | 5/2007 | Dignum | G06F 17/2705 717/143 |
| 2007/0192245 A1 | 8/2007 | Fisher et al. | |
| 2007/0220023 A1* | 9/2007 | Dean | G06F 17/30011 |
| 2007/0262138 A1 | 11/2007 | Somers et al. | |
| 2008/0098001 A1 | 4/2008 | Gupta et al. | |
| 2008/0209534 A1 | 8/2008 | Keronen et al. | |
| 2008/0243701 A1 | 10/2008 | von Mueller | |
| 2008/0263645 A1 | 10/2008 | Renter et al. | |
| 2009/0055531 A1* | 2/2009 | Brown et al. | 709/225 |
| 2009/0249082 A1* | 10/2009 | Mattsson | 713/193 |
| 2010/0191370 A1 | 7/2010 | Barragan Trevino et al. | |
| 2010/0257612 A1 | 10/2010 | McGuire et al. | |
| 2010/0306552 A1 | 12/2010 | LeVine et al. | |
| 2011/0035390 A1 | 2/2011 | Whitehouse | |
| 2011/0078782 A1* | 3/2011 | Chan et al. | 726/13 |
| 2011/0125597 A1* | 5/2011 | Oder et al. | 705/16 |
| 2011/0154466 A1 | 6/2011 | Harper et al. | |
| 2011/0154467 A1 | 6/2011 | Bomar et al. | |
| 2011/0167255 A1* | 7/2011 | Matzkel et al. | 713/153 |
| 2011/0247062 A1* | 10/2011 | Zon et al. | 726/6 |
| 2011/0307710 A1* | 12/2011 | McGuire et al. | 713/183 |
| 2012/0223889 A1* | 9/2012 | Medlock | G06F 3/04883 345/168 |
| 2012/0278339 A1 | 11/2012 | Wang | |

OTHER PUBLICATIONS

Office Action for U.S. Appl. No. 12/973,725; dated Jan. 15, 2014.
Office Action for U.S. Appl. No. 12/973,751; dated Sep. 6, 2012.
Office Action for U.S. Appl. No. 12/973,751; dated Apr. 1, 2013.
Shift4® Secure Payment Processing; 3 pages; available at <http://www.shift4.com/tokenization.cfm> (visited Dec. 20, 2010).
Dr. Heather Mark; *Tokenization—The Best Way to Secure Data is to Not Store Data*; Shift4® Secure Payment Processing; Aug. 2007; 8 pages; Shift4 Corporation.
Ulf Mattsson; *Protegrity: A New Scalable Approach to Data Tokenization; Nov. 2010*; 11 pages; available at <http://www.globalsecuritymag.com/Ulf-Mattsson-CTO-Protegrity-A-New,20101128,20823.html> (visited Dec. 20, 2010).
"Protegrity Vaultless Tokenization," Protegrity Corporation, Frequently Asked Questions (FAQ) Sheet, 5 pages, (2012). [Retrieved from the Internet Aug. 7, 2012: <URL: http://www.protegrity.com/wp-content/uploads/2012/04/Vaultless_Tokenization_FAQs_APRIL_12.pdf?mkt_tok=3RkMMJWWfF9wsRokuqjIZKXonjHpfsX%2B4u4kX7Hr08Yy0EZ5VunJEUWy2YYATtQhcOuuEwcWGog80B5XDuWSbolU4w%3D%3D&tkn_set=ygoIJ6CUdWJcoW5ytpPsVdeH6FK7Bv3N18gKaIiVp7xepzofCJ60VA%3D%3D >].

* cited by examiner

314

| Array Location | Token Value | Middle Digits | Check Digit |
|---|---|---|---|
| 1 | 20207423 | 63051736 | 51 |
| 2 | 01587101 | 01658158 | 57 |
| 3 | 60702927 | 28670572 | 70 |
| 4 | 64634720 | 43931376 | 68 |
| 5 | 33995603 | 88781797 | 93 |
| 6 | 16682318 | 19291550 | 67 |
| 7 | 37660657 | 37844043 | 73 |
| ... | ... | ... | ... |
| 99,999,998 | 68606353 | 81190163 | 66 |
| 99,999,999 | 56912499 | 66254068 | 82 |
| 100,000,000 | 41157465 | 37660657 | 73 |

FIG. 4

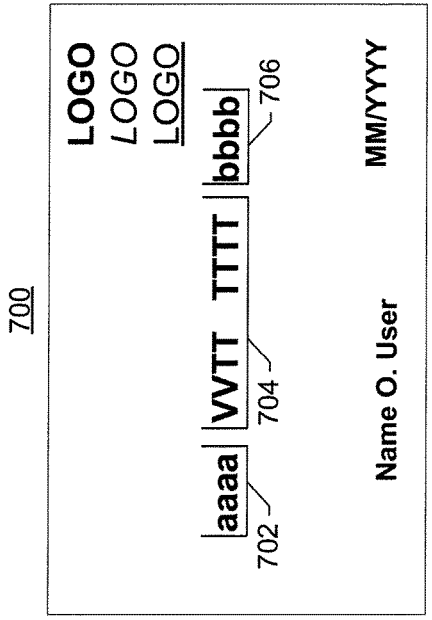
FIG. 7B
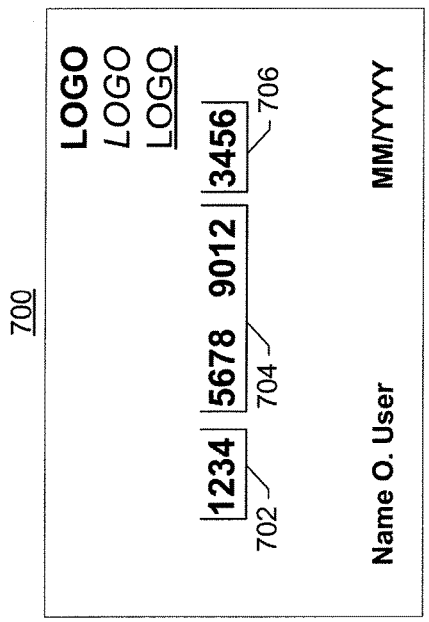
FIG. 7A
| Length of PAN | Length of randomized Middle Digits |
|---|---|
| 12 | 6 |
| 13 | 7 |
| 14-18 | 8 |
| 19 | 9 |
FIG. 7C

314

| Array Location | Token Value | Middle Digits |
|---|---|---|
| 1 | 20207423 | 63051736 |
| 2 | 01587101 | 01658158 |
| ... | ... | ... |
| 33995603 | 64634720 | 56789012 |
| ... | ... | ... |
| 56789012 | 33995603 | 19291550 |
| 56789013 | 16682318 | 37844043 |
| ... | ... | ... |
| 99999999 | 01658158 | 81190163 |
| 100000000 | 56912499 | 66254068 |

FIG. 14

TOKENIZED DATA SECURITY

CROSS-REFERENCE TO RELATED APPLICATION

This patent application is a continuation of U.S. Nonprovisional patent application Ser. No. 12/973,751, filed Dec. 20, 2010, which claims priority to U.S. Provisional Patent Application No. 61/288,102, filed Dec. 18, 2009, titled "TOKENIZED DATA SECURITY," which is hereby incorporated by reference in its entirety.

FIELD

Embodiments discussed herein relate to online data security.

BACKGROUND

Every day millions of people use debit cards, credit cards and other types of devices (collectively referred to herein as "credit cards") to purchase goods and services. Credit cards usually include a payment account number ("PAN") that includes the credit cards' 12-19 digit number. The PAN is often embossed into and printed onto the credit card. Most credit cards also include a magnetic strip or RFID circuit that stores data representing the credit card's PAN.

Once a credit card is used to purchase goods, networked devices may store the PAN maintaining security at the networked devices and availability of the information stored thereon is essential to the credit industry, commerce in general, and even modern society as a whole.

BRIEF SUMMARY

The Payment Card Industry ("PCI") compliance currently requires that steps be taken to protect the PAN from potential cyber attackers. Some embodiments of the present invention include tokenization at the edge systems of a distributed network, which may reduce the scope of applications that would governed by PCI compliance requirements.

As referred to herein, tokenization includes the process of replacing at least a portion of a PAN with a token to render a representation of the PAN useless to unauthorized observers. In some embodiments, the tokenization process can produce a tokenized PAN that has a field length (as determined by the number of characters in the PAN) that is the same as the untokenized PAN's field length. When implementing tokenization in accordance with some embodiments discussed herein, legacy system components (such as, e.g., applications, schemas, switches, servers, and/or databases) that are currently configured to pass and/or store non-tokenized PANs may continue to operate as they are currently configured, even if they happen to receive tokenized PANs provided by systems and apparatuses in accordance with embodiments discussed herein.

Some embodiments discussed herein can be implemented using one or more of the following components: a token map generator, a pre-parser, a parser, a tokenizer and a detokenizer. In some embodiments, the above listed components and/or processes preformed thereby may be combined and/or divided among various components and/or systems.

A token map generator can comprise a machine configured to generate a token map that associates a portion of a PAN to a token. In some embodiments, there may be one hundred million tokens included in each token map, and any one of the tokens may be associated with any one of the PANs (and/or other type of code). The generated token map may be written to an encrypted file and used as an input in the tokenizing and/or detokenizing processes.

A tokenizer can comprise a machine configured to tokenize a PAN. For example, the tokenizer can be configured to receive a PAN (and/or other type of code) and a token map as inputs, and output a token with the same number of alphanumeric characters (or any other type of characters) as the inputted PAN. Alternatively or additionally, the tokenizer may output a token that has a different number of characters than the inputted PAN. The outputted token may be substituted in between characters of the original PAN and used for application communications and storage, such as those related to purchasing goods and services. The token can be subsequently used as input to a detokenizer. Access to the token map, the tokenizer and/or its process can be protected for use by only trusted applications and/or secured hardware.

In some of the exemplary embodiments discussed herein, a tokenized PAN can comprise three parts: a prefix, six to nine middle digits (including a token map version identifier and a token) and a suffix. Alternatively or additionally, the tokenized PAN can comprise more or less parts and/or each of the parts may comprise more or less digits.

The suffix of a tokenized PAN may include the same value as the last digits of the original PAN that is received. The middle digits of the tokenized PAN may comprise, for example, a randomly generated token that is based on the PAN's original middle digits (as opposed to only being based on when the credit card is used). Systems in accordance with some embodiments may be configured to dynamically generate the token such that the total length of the token depends on or is otherwise associated with the total length of the untokenized PAN. For example, in response to determining the untokenized PAN length is twelve digits, the system may be configured to generate a token that consists of six characters. As another example, in response to determining the PAN length is thirteen digits, the system may be configured to generate a token that has a length of seven characters. As yet another example, in response to determining the PAN length is fourteen to eighteen digits, the system may be configured to generate a token that has a token length of eight characters. As a final example, in response to determining the PAN is nineteen digits, the system may be configured to generate a token that is nine characters in length.

A detokenizer can comprise a machine configured to, for example, convert a token generated by the tokenizer into the original PAN (or other type of code). Access to this process can be protected for use by only trusted endpoints. The detokenizer may be configured to only be called from applications that need to process the PAN.

Although much of the disclosure is focused on tokenizing middle digits values and not tokenizing prefix values and suffix values, any segment or segments of a PAN or other type of code may be tokenized, while one or more other segments remain untokenized. In some embodiments, rather than tokenize a middle digits value (comprised of digits in the middle of a PAN), a tokenizer may tokenize a "targeted segment" that may be comprised of one or more characters positioned throughout the PAN. The targeted segment may include, for example, two or more characters or portions of characters that are located next to each other, characters dispersed individually throughout the PAN, and/or any combination thereof. Like the middle digits values discussed above, some embodiments may or may not define the targeted segment based on character(s) predetermined location(s) within a given PAN. Similarly, rather than not tokenizing a prefix value (located before a targeted segment of characters) and/or suffix value (located after a targeted segment of characters), some embodiments may have one or more "non-targeted values" that, like the prefix and suffix values discussed above, remain untokenized in a tokenized PAN. Likewise, rather than replace a token with a middle digits value during detokenization, the token may be replaced with the targeted segment. In this regard, a token map may be generated to associate token values with targeted values and targeted values with token values. Non-targeted values may also remain the same when a tokenized PAN is being detokenized. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 shows an exemplary token map in accordance with some embodiments of the present invention;

FIGS. 7A and 7B show an exemplary credit or debit card that includes a sixteen digit, base10 PAN and how a parser may parse the PAN into separate values in accordance with some embodiments of the present invention;

FIG. 7C shows a table that correlates various untokenized PAN lengths with various lengths of middle digits that are to be tokenized in accordance with some embodiments of the present invention;

FIG. 14 shows a portion of an exemplary token map that may be used to facilitate detokenizing the token and/or tokenized PAN.

DESCRIPTION

Figure 1:
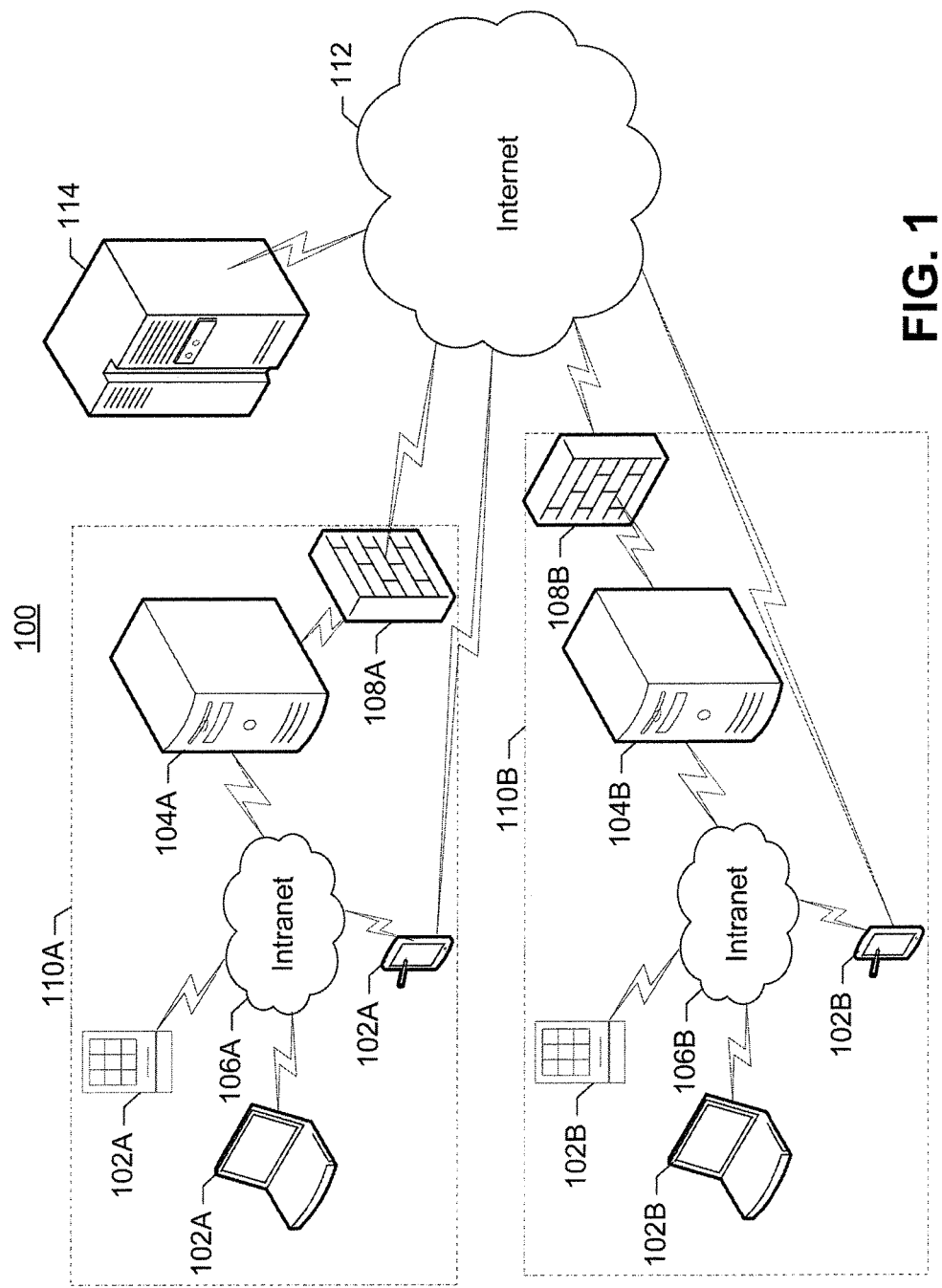
FIG. 1 shows a system includes exemplary machines that can be configured to implement some embodiments of the present invention.

Exemplary embodiments of the present invention are described in more detail hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As defined herein a "computer-readable storage medium," which refers to a physical storage medium (e.g., volatile or non-volatile memory device), can be differentiated from a "computer-readable transmission medium," which refers to an electromagnetic signal. Additionally, as used herein, the term "circuitry" refers to not only hardware-only circuit implementations including analog and/or digital circuitry, but at least also to combinations of circuits with corresponding software and/or instructions stored on a computer-readable storage medium.

Example embodiments of the present invention may be configured to support various security and other functionalities in, for example, an online sales environment, credit card sales application, any other type of system, or combination thereof. Embodiments discussed herein can be implemented using hardware and other machine components implemented by one or more servers, source devices, any other type of machine, and/or any combination thereof.

Embodiments discussed herein solve a number of problems, such as those related to data storage requirements, speed and security risks associated with existing centralized token databases. To overcome these problems, one of ordinary skill in the art may be tempted to focus on innovation that leverages the current systems and methods. For example, one skilled in the art may focus on ways to better encrypt data stored in large centralized databases. Some of the embodiments discussed herein, however, may be used on their own and/or built on top of existing systems, such as those that used large centralized databases. Among other things, the following disclosure includes exemplary embodiments for protecting information by using a completely new approach.

Overview

Many of the examples discussed herein are related to PANs included in credit card numbers. One skilled in the art would appreciate that embodiments discussed herein may be configured for any type of code, including those other than or in addition to credit card numbers' PANs. For example, methods, systems, computer readable media and/or other means similar to or the same as those discussed herein can be used to protect any type of information, including social security numbers, bank account numbers, healthcare information, travel itineraries, any other information, or any combination thereof.

Credit cards often have between 12 and 19 digit PANs depending on the credit card provider. Tokenization of a targeted segment comprising at least some of the PAN, such as the middle digits, may allow applications to transmit and store the tokenized PANs without risking untokenized PANs being stolen, while still allowing a detokenization process in accordance with some embodiments to obtain the original PAN and/or other type of number (if different from the PAN).

FIG. 1 shows system 100 which includes exemplary machines that can be configured to implement embodiments of the present invention. A number of source devices 102A can communicate with server 104A via a network, such as intranet 106A. In FIG. 1, source devices 102A include a computer, a handheld device and a credit card reader, which can each be configured to access intranet 106A via a wired or wireless connection. Other types of devices, including those that can receive a credit card number and generate a representative electrical signal, can be connected to intranet 106A. Intranet 106A is an example of a network and can be comprised of any number of public and/or private devices, including routers, servers, databases, antennas, switches, cellular towers, satellite systems, and/or any other machine that facilitates wired and/or wireless network communications. Exemplary components of source devices 102A are discussed further below in connection with, e.g., FIG. 2.

Server 104A can be a machine configured to operate as, among other things, a pre-parser, parser, token map generator, tokenizer and/or detokenizer. For example, server 104A may comprise one or more apparatuses that are configured to generate and maintain one or more token maps in accordance with some embodiments discussed herein. In some embodiments, the security of the system is at least partially founded in the randomness of the token generation and security of a "token map." The token map, as referred to herein, is a table, multi-dimensional array, or other means for associating a token with a PAN or portion thereof (such as the middle eight digits of a PAN). Exemplary components of server 104A are discussed further below in connection with, e.g., FIG. 3A and exemplary embodiments of token maps are discussed in connection with, e.g., FIGS. 8 and 14.

Additionally or alternatively, server 104 may be configured to tokenize a PAN before transmitting the PAN to an unsecured system, over a public network or to any other device that may be at risk (or a relatively high risk) of cyber attack. Server 104A can be configured to implement and/or be coupled to firewall 108A, which can also be coupled to internet 112. Firewall perimeter 110A, which shown around source devices 102A, server 104A, intranet 106A and firewall 108A, is included in FIG. 1 to show which devices may have access to an untokenized PAN received by source devices 102A. For example, server 104A can be configured to tokenize any data it receives after determining the received data represents a credit card's untokenized PAN.

Figure 5:
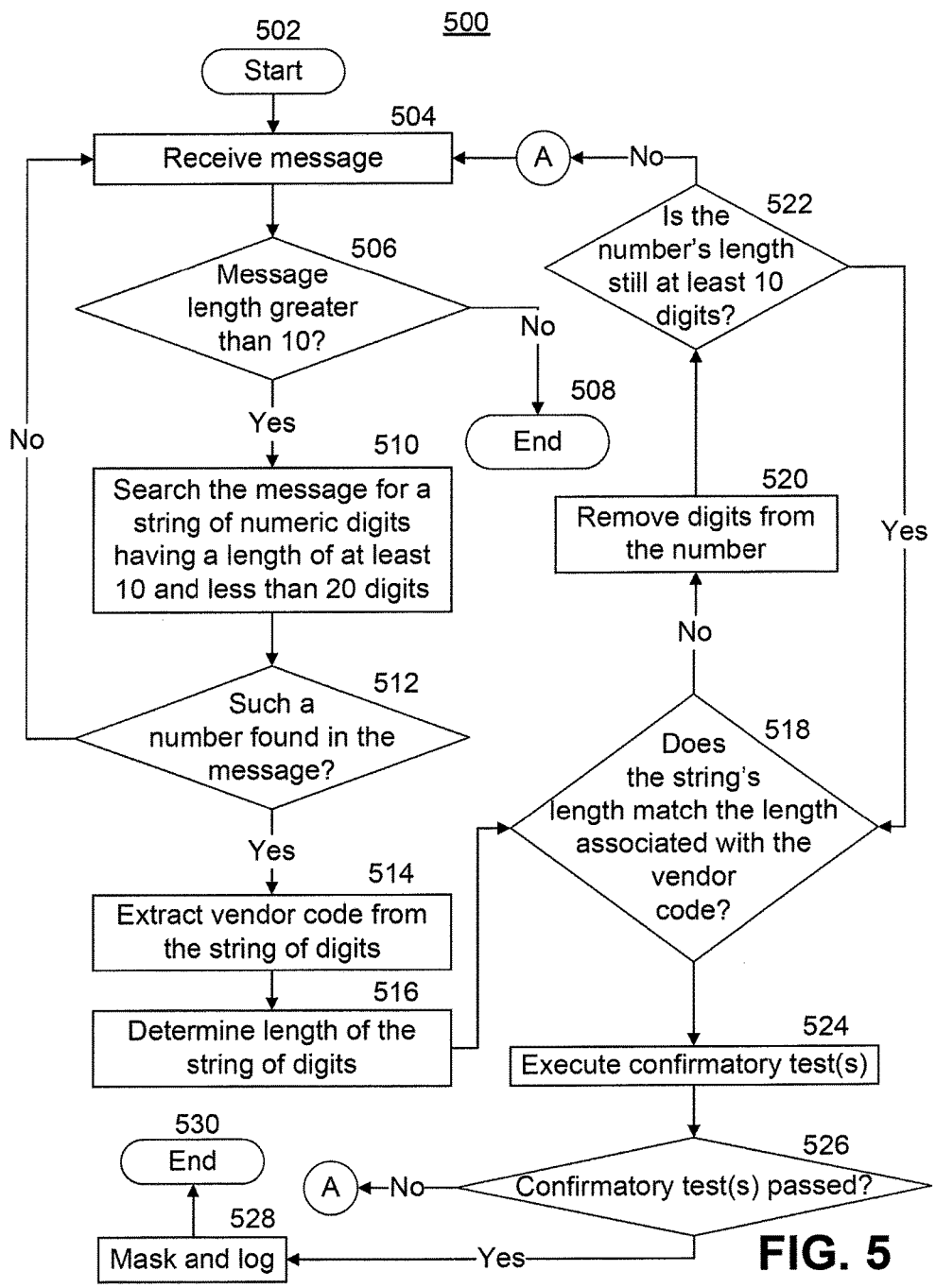
FIG. 5 shows a flow chart implementing an exemplary process that may be used to pre-parse a received message to locate the presence of an account number that is to be tokenized in accordance with some embodiments of the present invention.

FIG. 5 shows an exemplary method for determining that server 104A (and/or any other device or devices) has received an untokenized PAN. The received data may have been generated by source devices 102A, one or more other machines inside firewall perimeter 110A (not shown), and/or one or more other machines outside firewall perimeter 110A. As such, firewall perimeter 110A can represent, for example, an electronic boundary including a group of machines that has access to untokenized PANs or a group of machines that has access only to tokenized PANs, where server 104A acts as a tokenizer that tokenizes or detokenizes the PANs that it receives before serving the PANs to the other machines within firewall perimeter 110A.

For example, the machines within firewall 110A may be consumer and retail system devices that are used to facilitate electronic payment, including capturing credit card numbers from magnetic strips. Server 104A may be configured to tokenize all the credit card PANs before sending the PANs to a machine outside firewall perimeter 110A.

As another example, the machines within firewall 110A could be machines used by an online vendor, such as an online travel agency. The online travel agent may make reservations and schedule trips for customers. To help protect its customers' financial and/or other personal data, the online travel agency may tokenize every PAN it receives from internet 112, before the personal data is delivered to any travel agent's networked device (such as source device 102A). As the tokenized data passes back through server 104A (e.g., after being processed by the travel agent's computer), the data can be detokenized so that external devices (that may not be configured to implement features of the present invention) are able interpret and correctly process the PAN (or other) data. As such, server 104A may also (or instead) be configured as a detokenizer.

In some embodiments, two or more servers of system 100 can be configured to collaborate and implement features of the present invention. For example, system 100 can be configured to utilize a decentralized or distributed tokenization architecture (as opposed to or in addition to a central tokenization system). To help show an example of the decentralized embodiments, FIG. 1 includes source devices 102B, server 104B, intranet 106B, firewall 108B and firewall perimeter 110B, which can each function the same as or similar to source devices 102A, server 104A, intranet 106A, firewall 108A, and firewall perimeter 110A, respectively.

In some embodiments, server 104B can be configured to archive server 104A's token map(s). For example, after establishing a secured connection (using, e.g., the SSL protocol, or any other suitable protocol), server 104A can electronically transfer its token map(s) to server 104B. Similarly, updates can be made to server 104B's backup copy of server 104A's token map(s). The updates can occur periodically (e.g., hourly, daily, weekly, etc.) or in response to a trigger event (such as, e.g., server 104A generating and/or updating a token map, a network administrator of server 104A or server 104B initiating the backup/transfer procedures, etc.).

Similar to or the same as intranet 106A and 106B, internet 112 is an example of a network and can be comprised of any number of publicly and/or privately accessible devices, including routers, servers, databases, antennas, switches, cellular towers, satellite systems, and/or any other machine that facilitates wired and/or wireless network communications.

Mainframe 114 represents a central tokenization system that includes an internal server and database. While some embodiments may sufficiently protect numeric and other information absent a central tokenization system, other embodiments can enhance or add another layer of security to centralized tokenization systems. For example, mainframe 114 can be configured to store, in their entireties, every PAN mainframe 114 has every received. Additionally, mainframe 114 may be configured to store its own, independently generated token associated with each PAN as well as the algorithm and instructions for generating a token from a PAN. While the other machines shown in FIG. 1 may appear to function the same as electronic payment processing systems (from the perspective of mainframe 114), the other machines shown in FIG. 1 may be backwards compatible with existing mainframes while also being configured to implement additional data security protections, some examples of which are described herein, on top of at least some of the traditional approaches that may be implemented by mainframe 114.

For example, the credit card industry (and/or other business organizations) may rely on one or more central databases, such as PAN mainframe 114, to persistently store and maintain the entire PAN for each credit card ever processed by system 100. In addition to the PANs, mainframe 114 can generate and/or store tokens that represent the complete PANs (instead of a portion thereof). The central database can also (or instead) be configured to tokenize a PAN by, e.g., mapping each token to a corresponding complete PAN. The tokens can then be used instead of or in addition to the PANs when transmitting credit card information over unsecured lines using public and/or private networks. As such, the tokens can act as an additional layer of network security when performing credit card transactions using mainframe 114.

In addition to or instead of utilizing a pre-generated token map that is in accordance with some embodiments discussed herein, each token can be generated by a centralized tokenization system in real (or near real) time. For example, server 104A, server 104B and/or mainframe 114 may be configured to assign a token based on when a credit card is first used to purchase a good or service relative to when other credit cards are first used with the system (and instead of or in addition to, e.g., assigning a token based on the content of a portion of the PAN and a randomly generated token map).

When implementing a temporal-based token assignment approach, system 100 can be configured to search a central database (such as that included in mainframe 114) to see if the received PAN has been previously tokenized. If the compete PAN is not found in the central database, a random token can be generated based on when the PAN was received relative to other PANs. The temporal-based token assignment system then has to determine new token that is available which can require another search of the database. The searching can be costly, in terms of time, money, processing power, and bandwidth. If the randomly selected token is determined to have been used previously, the process can be repeated until a unique token has been successfully generated for the PAN by system 100. Once the token is generated, the token can be stored with the entire PAN in the central database. For the temporal-based token assignment system to work properly, system 100 and its central database must be persistently available to tokenize and detokenize PANs for every transaction. Scaling, availability and locality can therefore be limited by the temporal-based token assignment database.

As a result, a temporal-based token assignment database often requires costly security and storage. Much innovation has thus far been focused on how to block hackers from accessing the large central databases, while still storing millions of complete credit card numbers that source devices can efficiently access. Additionally, there has been much research into development of how to decrease database access time.

Despite the layers of security and risk of potential jail time, the large amount of credit card numbers together in a central database attracts hackers. Large organizations have experienced major financial, legal and publicity problems after its temporal-based token assignment databases were hacked, and tens of millions of complete credit card PANs were stolen. In addition to credit card databases, other types of large central databases (such as those that store personal information, financial information, social security numbers, etc.) are also at risk.

Data availability is almost, if not just as, important as data security to business operations. In many instances, credit card purchases may not be authorized if the temporal-based token assignment database is offline. To keep the token and PAN data available, data redundancy, among other things, can be implemented by systems implementing a temporal-based token assignment approach. Accordingly, in some embodiments, system 100 may not implement the temporal-based token assignment approach, and instead only utilize a pre-generated token map that randomly associates token values with portions of PAN values.

In some embodiments, mainframe 114, firewall 110A, firewall 110B, some types of the source devices 102, and/or any other device discussed herein may be omitted from system 100. The particular types of devices included in system 100 and their functionality are intended to be exemplary only.

Figure 2:
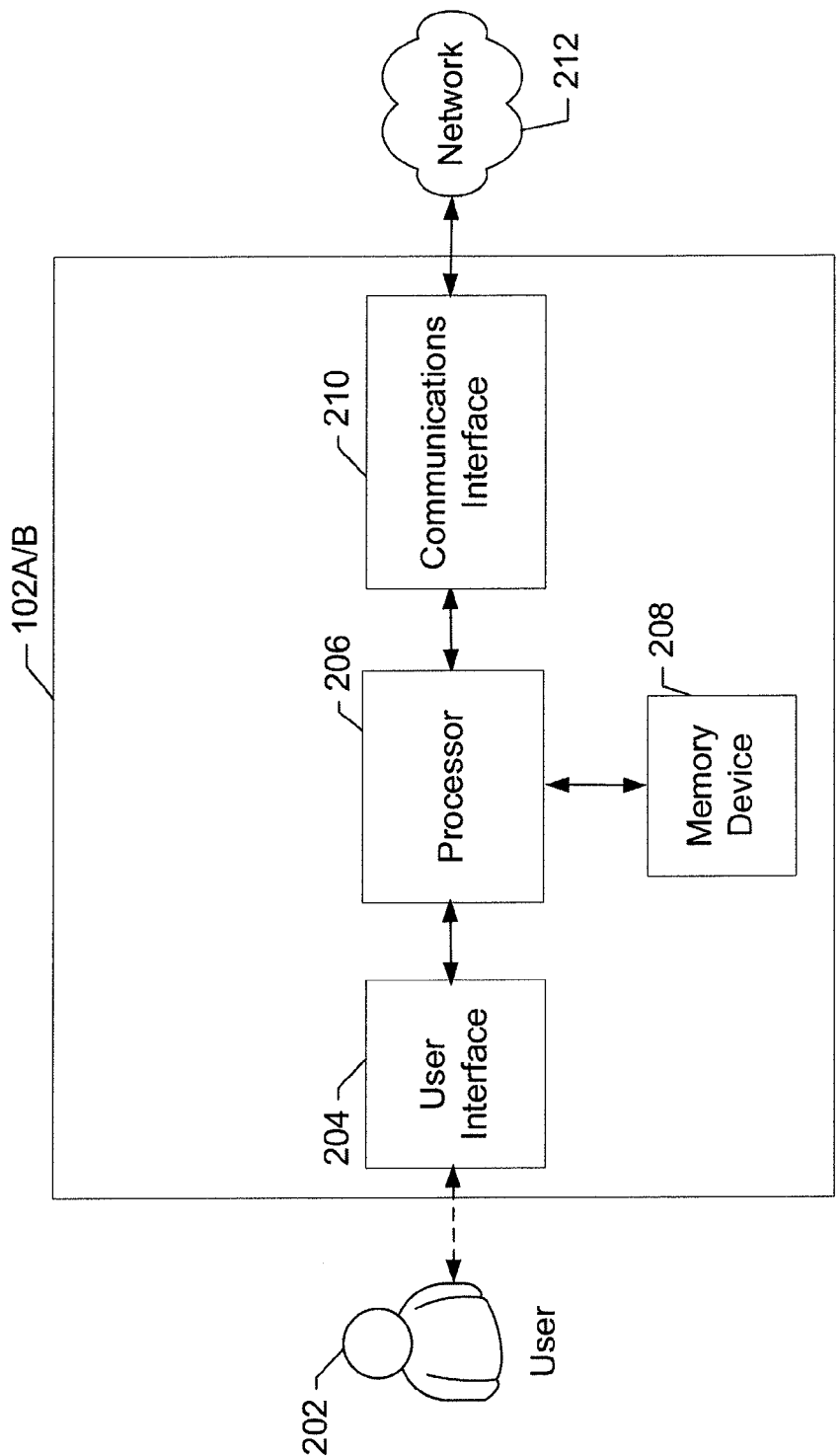
FIG. 2 shows exemplary components of a source device in accordance with some embodiments of the present invention.

FIG. 2 shows exemplary components of source device 102. User 202 can enter information into source device 102 using user interface 204. User interface 204 can be any type of component that can transform user-entered information, including a PAN, into electrical data that can be transmitted, stored and/or processed by a machine. For example, user interface 204 can comprise a magnetic strip reader, RFID reader (for passive, active and/or semi-passive RFID tags), keyboard, mouse, touch-sensitive component, display screen, microphone, imaging device, any other type of input device and/or any combination thereof.

The data generated by user interface 204 can be sent to processor 206. Processor 206 can be any suitable circuitry configured to, among other things, process data representing untokenized PANs, tokenized PANs, detokenized PANs, any other type of data, or any combination thereof. For example, one or more of various processing means or devices such as a coprocessor, a microprocessor, a controller, a digital signal processor (DSP), a processing element with or without an accompanying DSP, or various other types of processing hardware including integrated circuits such as, for example, an ASIC (application specific integrated circuit), an FPGA (field programmable gate array), a microcontroller unit (MCU), a special-purpose computer chip, or any combination thereof. In some exemplary embodiments, processor 206 may be configured to execute instructions stored in memory device 208 or otherwise accessible to processor 206. The instructions may be permanent (e.g., firmware) or modifiable (e.g., software) instructions can be organized in any manner. Alternatively or additionally, processor 206 may be configured to execute hard coded functionality. As such, whether configured by hardware or software methods, or by a combination thereof, processor 206 may represent an entity (e.g., physically embodied in a machine) capable of performing operations according to embodiments of the present invention while configured accordingly. Thus, for example, when processor 206 is embodied as an ASIC, FPGA or the like, processor 206 may be specifically configured hardware for conducting the operations described herein, including those associated with pre-parsing, parsing token map generation, tokenization and detokenization. Alternatively, as another example, when processor 206 is embodied as an executor of software or firmware instructions, the instructions may specifically configure processor 206 to perform the algorithms and/or operations described herein when the instructions are executed. Processor 206 may include, among other things, a clock, an arithmetic logic unit (ALU) and logic gates configured to support operation of processor 206.

Memory device 208 may include, for example, one or more nontransitory computer readable storage media that can comprise volatile and/or non-volatile memories. For example, memory device 208 may be an electronic storage device (e.g., a computer-readable storage medium) comprising gates (e.g., logic gates) configured to store data (e.g., bits) that may be retrievable by a machine (e.g., a computing device including a processor such as processor 206). Memory device 208 may be configured to store information, data, applications, instructions or the like for enabling processor 206 to carry out various functions in accordance with exemplary embodiments of the present invention. For example, memory device 208 may be configured to buffer input data for processing by processor 206. Additionally or alternatively, memory device 208 could be configured to store instructions for execution by processor 206.

Communications interface 210 can be configured to facilitate any type of wired and/or wireless communications. For example, communications interface 210 can facilitate communications through direct or dial-up telephone infrastructure, cable modems, fiber optic cables, satellite systems, cellular networks, WANs, LANs, and/or through an additional network component which may be used to form network 212. Network 212 can be the same as or similar to intranet 106A or 106B or internet 112 of FIG. 1.

Figure 3A:
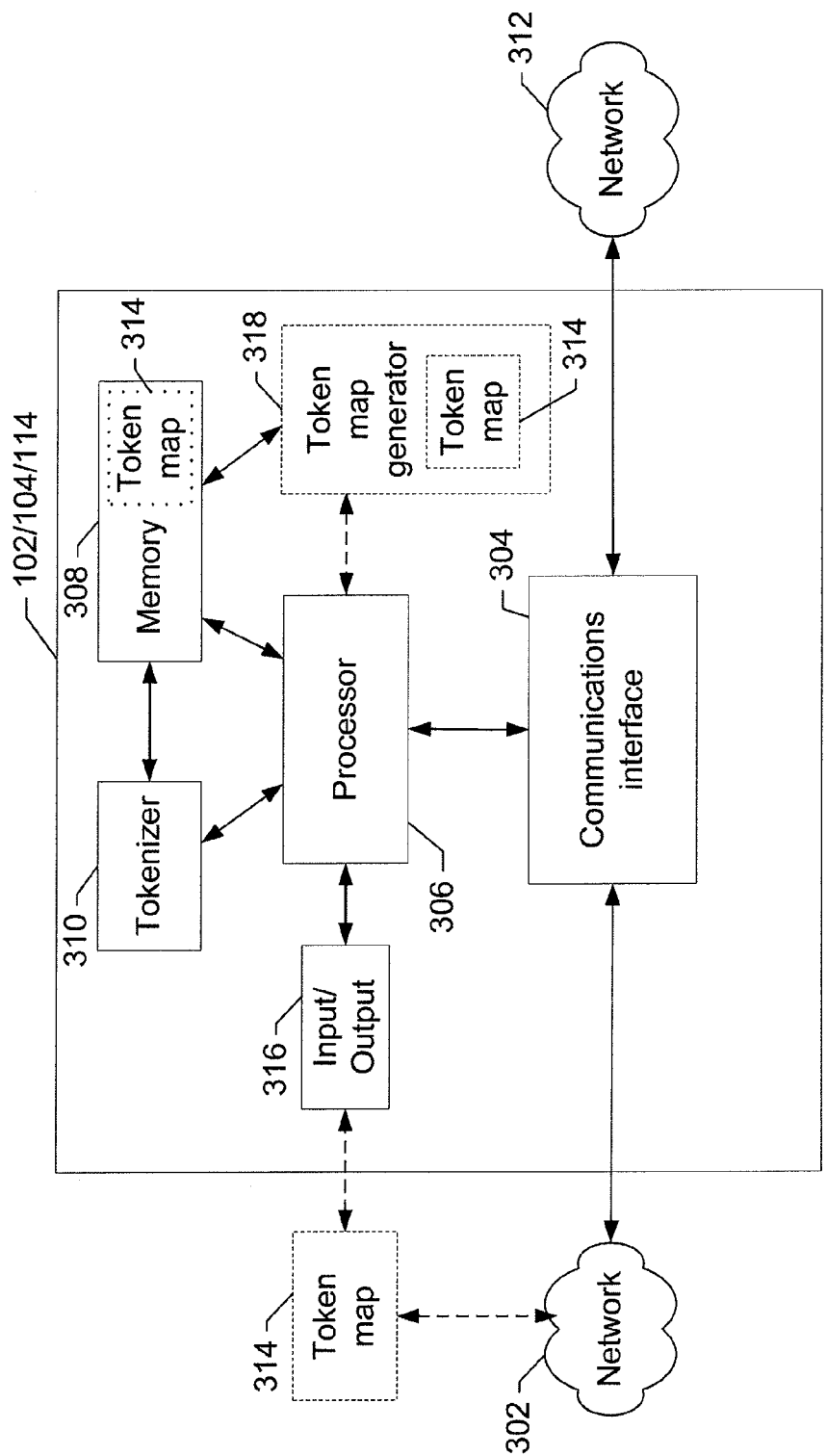
FIG. 3A shows exemplary components of a server device that may function as a pre-parser, parser, token map generator, tokenizer, detokenizer pre-parser, detokenizer parser, and/or detokenizer in accordance with some embodiments of the present invention.

FIG. 3A shows exemplary components of server 104, which may be the same as or similar to servers 104A and/or 104B discussed in reference to FIG. 1.

Network 302 is shown as a source of incoming data that is received by communications interface 304. Network 302 can be comprised of anything discussed in connection with, e.g., network 212, intranet 106A, intranet 106B and/or internet 112. Communications interface 304 can be comprised of anything discussed in connection with, e.g., communications interface 210. Similarly, processor 306 can be comprised of one or more of the components discussed in connection with, e.g., processor 206, though processor 306 may be configured to be optimized primarily for server functionality, while processor 206 may be configured to be optimized primarily for client functionality. Memory 308 can be comprised of one or more of the components discussed in connection with, e.g., memory 208, though memory 308 may be configured to be optimized primarily for server functionality (e.g., including RAID or other server-grade storage) while memory 208 may be configured to be optimized primarily for client and/or user device functionality. In some embodiments, memory 308 can be configured to store the token map 314, which may be received by communications interface 304 and/or input/output interface 316 or which may be generated by token map generator 318.

Tokenizer 310 can be dedicated circuitry responsible for tokenizing and detokenizing data, such as PANs, in accordance with embodiments of the invention, some of which are discussed below. In some embodiments, tokenizer 310 can be a module, software, firmware, hardware, and/or anything else implemented by and/or able to communicate with processor 306 via an internal bus or other type of communications path. In some embodiments, tokenizer 310 may be included in server 104 as shown in FIG. 3A.

Alternatively or additionally, tokenizer 310 may be its own device and/or at least partially included in a device other than server 104. In such embodiments, tokenizer 310 may include its own hardware (including, e.g., processor, memory, etc.), software, firmware and/or any other component that may be needed or useful for tokenizing data.

In some embodiments, tokenizer 310 can be configured to execute four (or any other number) of applications. Each application can be implemented using, e.g., an application layer interface. One application is a tokenize application, which enables the tokenizer to take an untokenized PAN, and return a tokenized PAN (as discussed in connection with FIGS. 4A through 9C). Another application is the detokenize application (as discussed in connection with FIGS. 10 through 14), which includes receiving and analyzing a tokenized PAN and outputting a detokenized PAN. In some embodiments, the detokenized PAN may be the same as the untokenized (and/or original) PAN. A third application is the Luhn check application, which can be used to receive and analyze the tokenized PAN and output a signal, such as a true or false (logic 1 or 0) signal. A fourth application includes configuring the tokenizer to determine the issuer (e.g., bank, credit institution, etc.) based on, for example, a bank identification number ("BIN") of the PAN, which can include receiving and analyzing a tokenized PAN and returning the issuing identifier of the PAN.

In some embodiments, one or more of the applications included in tokenizer 310 may be implemented in a stand alone device, in separate component and/or at least partially included in a device/component other than server 104 and/or tokenizer 310. For example, the detokenize application may be implemented in a separate detokenizer that may be configured to communicate directly with server 104's processor and/or other components. As another example, the detokenizer may include its own hardware (including, e.g., processor, memory, etc.), software, firmware and/or any other component that may be needed or useful for detokenizing data.

Similarly, functionality of other components of server 104 (and/or any other apparatus discussed herein) may be implemented as a stand alone device and/or be at least partially implemented by a device/component other than server 104. For example, token map generator 318 may be configured to generate token map 314 (which is discussed further in reference to FIG. 3B). Token map generator 318 may be implemented as a component of server 104 as shown in FIG. 3A, including processing circuitry, memory, and/or any other nontransitory hardware (some examples of which are discussed above in connection with processor 306 and/or memory 308).

Alternatively or additionally, the functionality of token map generator 318 may be implemented by processor 306, any other component of server 104, and/or any other component external to server 104. For example, token map 314 may be received from a networked device using communications interface 304, and/or from a peripheral device using input/output interface 316, among other things. Input/output interface 316 may include, for example, one or more ports, such as a universal serial bus ("USB") port and/or any other data port(s) (including wireless ports) that can receive transitory data from an external source, such as from an external nontransitory storage medium by which token map 314 may be generated, modified (including encrypted) and/or stored. Additionally or alternatively, input/output interface 316 may include, for example, one or more ports and/or other physical components enabling a keypad, touch display screen, and/or other input/output components to be coupled to server 104.

Although the discussion herein generally focuses on the components shown in FIG. 3A as well as the tokenizing, detokenizing, parsing, and pre-parsing being implemented in a server, the same and/or similar components may also be implemented in a source device (such as source device 102A), a central mainframe (such as mainframe 114), and/or any other device. For example, a smart telephone, peripheral device (such as card reader that is coupled to a portable device) and/or other computing device may have an application loaded thereon that enables the hardware of the computing device to function as a token map generator, tokenizer, detokenizer, parser and/or pre-parser. In some embodiments, every electrical device may have one or more of its own token maps assigned by a central system and/or generated locally by the electrical device. For example, a central system (such as server 104 and/or mainframe 114) may assign source device 102 a token map version identifier and provision source device 102 to generate its own token map. Source device 102 may then function as discussed in connection with, e.g., FIG. 3A and tokenize/detokenize PANs based upon its locally generated token map.

Token Map Generation

Figure 3B:
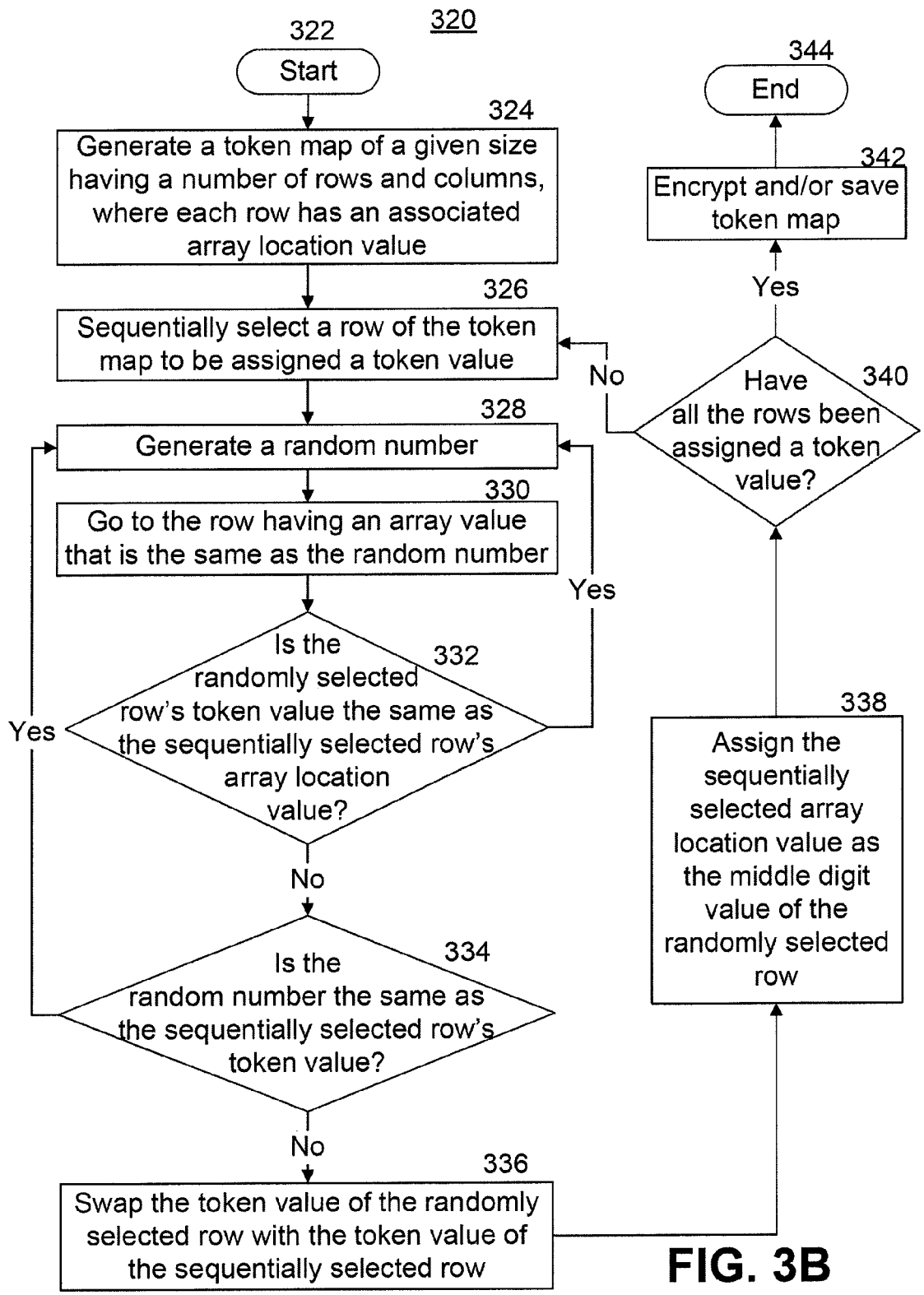
FIGS. 3B and 3C shows flow charts implementing exemplary processes that may be used to generate a token map in accordance with some embodiments of the present invention.

FIG. 3B shows process 320, which may be used in accordance with some embodiments to generate token map 314. Like some other processes discussed herein, process 320 is represented by a flow diagram in accordance with some exemplary methods, computer program products and/or systems discussed herein, including token map generator 318. It will be understood that each operation, action, step and/or other types of functions shown in the diagram, and/or combinations of functions in the diagrams, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein. For example, program code instructions associated with FIG. 3B may be stored on a storage device, such as memory 308, and executed by one or more processors, such as processor 306 and/or token map generator 318. Additionally or alternatively, one or more of the program code instructions discussed herein may be stored and/or performed by a component external to server 104. As will be appreciated, any such program code instructions may be loaded onto a computer, processor, other programmable apparatus (e.g., processor 306, token map generator 318, among other things) or network thereof from one or more computer-readable storage mediums (e.g., memory 308, memory included within processor 306, and/or memory included in token map generator 318, memory external to server 104, etc.) to produce a particular machine, such that the particular machine becomes a means for implementing the functions of the actions discussed in connection with, e.g., FIG. 3B and/or the other drawings discussed herein. As such, the drawings showing other flow charts included herein may likewise represent program code instructions that may be loaded onto a computer, processor, other programmable apparatus or network thereof to produce a particular machine.

The program code instructions stored on the programmable apparatus may also be stored in a computer-readable storage medium that can direct a computer, a processor (such as processor 306, token map generator 318, tokenizer 310, etc.) and/or other programmable apparatus to function in a particular manner to thereby generate a particular article of manufacture. The article of manufacture becomes a means for implementing the functions of the actions discussed in connection with, e.g., FIG. 3B and the other flow charts included herein. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., process 320 of FIG. 3B.

Process 320 starts at 322. At 324, the processor (which may be comprised of more than one can physical component) can be configured to generate an array of a predetermined size. The array may be considered an unsigned token map. For example, an unassigned token map may have 100,000,000 rows with one or more columns comprised of empty elements. Each row of the array may be associated with an array location value (e.g., sequential integers 1 through 100,000,000) and a token value (e.g., sequential integers 0 through 99,999,999).

FIG. 4 shows an exemplary token map 314 that has been populated by a process such as process 320. After 324 and before 326, token map 314 may include a populated array location column 402 and a populated token column 404 as well as two or more unpopulated data array columns, such as middle-digits column 406 and check-digits column 408. All the data array columns can be configured in memory locations for easy lookup.

Returning to FIG. 3B, at 326, the processor can be configured to sequentially select array location values that are each associated with a row. Any algorithm may be used to select an unassigned row's array location value at 326. For example, the processor may select the row having the smallest array location value that has not yet been reassigned a random token value (as discussed below).

At 328, the processor can be configured to generate a random number. For example, the processor may generate a random integer ranging from 1 to 100,000,000 inclusive. Any other bounds may be used, which may or may not be the same as the bounds used for the original array location values. The random number generator may be seeded at the start with the current time to obtain a unique random number that would be hard to duplicate. In some embodiments, a new seed may be introduced to the random number generator every predetermined number of iterations to further obscure the randomness.

At 330, the processor locates the row having the array value that matches the random number generated at 328. For example, if the random number is "5", the processor will go to the row of token map 314 that has "5" as its array location value. In some embodiments, the random number may act as a pointer to a memory location.

At 332, a determination is made as to whether or not the randomly selected row's token value is the same as the sequentially selected row's array value. If the randomly selected row's token value is the same as the sequentially selected row, a new random number is generated at 328.

In response to determining the randomly selected row's token value is the same as the sequentially selected row's array value, a determination is made at 334 as to whether or not the randomly selected row's array location value is the same as the sequentially selected row's token value.

In response to determining the randomly selected row's array location value is the same as the sequentially selected row's token value, a new random number is generated at 328. In response to determining the randomly selected row's array location value is different than the sequentially selected row's token value, process 320 proceeds to 336.

Executing 332 and 334 may help assure that the tokenized PAN is different than the untokenized PAN. In other embodiments, this functionality (and/or any other functionality) may be omitted and the tokenized PAN may have the potential to be the same as the untokenized PAN. Additionally or alternatively, other functionality may be employed to help assure that the tokenized PAN is different than the untokenized PAN. For example, the randomization criteria may also or instead include logic that may be used to generate token values having a length of 6 or 7, instead of 8.

At 336, the token value of the randomly selected row is swapped with the token value of the sequentially selected row. In this regard, the randomly selected row will now have a token value that was previously associated with the sequentially selected row and the sequentially selected row will now have a token value that was previously associated with the randomly selected row. As such, the token map can be generated by randomly iterating through the rows and swapping values at the iterator location with a value at a random location.

At 338, the sequentially selected row's array location value can be assigned as the middle digits value (or any other type of targeted segment) associated with the randomly selected row. This may enable the token map to be used for detokenization.

In some embodiments, rather than or in addition to assigning each middle digits value after assigning each token value, the processor may be configured to assign all the middle digits values after assigning all of the token values. In yet other embodiments, the processor may be configured to assign the middle digits values before assigning the token values, either individually or collectively.

Process 320 may proceed to 340, where a determination is made as to whether or not all of the rows have been involved in a token value swap and/or used by the processor as the sequentially selected row. In response to determining at 340 that one or more rows have not, process 320 may return to 326 and repeat the steps discussed above until 340 has been satisfied.

In response to determining at 340 that all the rows have been involved in a token value swap and/or used as the sequentially selected row, process 320 may proceed to 340 and encrypt, save, transmit and/or otherwise output the completed token map. In some embodiments, token map 314 can be encrypted using any suitable approach (such as, e.g., RSA key manager or "RKM") and may only be stored or otherwise exist within the PCI Vault of the server (as mentioned above). For example, token map 314 can be loaded into the server's (or other type of tokenizer's) dedicated memory at startup and, in some embodiments, token map 314 need not change thereafter. The encrypted token map may be stored such that both an authorized tokenizer and detokenizer can access and read the token map.

In some embodiments, the token map can be given a file name at 340 that includes a unique two character identifier that identifies the token rendering version. In order to maintain the original PAN length and include a two character token map version identifier, the token can be converted into a base36 number (e.g., A-Z and 0-9). This may make two character positions available to store the token map version identifier. As discussed further below, the original PAN length can be used to determine the length of both the prefix and middle digits value used as a basis for the Base36 token. The tokenized PAN can assume the following format: Prefix+Version ID+Base36+Suffix. As noted elsewhere herein, the middle digits value is but one type of exemplary targeted segment that can be tokenized. In some embodiments, the tokenized PAN may assume a different format, such as, e.g.: non-targeted value1+targeted segment+non-targeted value2+Version ID+targeted segment+non-targeted value3.

The two character token map version identifier can also be a base36 number, a letter and a number and/or formatted any other way. The token map version identifier may be used by, e.g., the tokenizer and detokenizer to identify the token map that was used to tokenize the PAN and can be used for detokenizing the PAN. In addition to being encrypted, the token map may also be protected by limiting the devices that are allowed to access the token map. At 342, process 320 ends.

In some embodiments, rather than or in addition to executing 330 after 328 (or otherwise after each swap is executed), all values can be checked collectively after determining that all the rows have been swapped. The collective check can be used to make sure each token value is not in its original position and/or is not equal to its associated location array value. If it is determined that a token value is in its original position, then the token value can be swapped with a random location as discussed above. The collective position check can be repeatedly performed until all tokens are in a new position in the token map. Once this is complete, the build of the token map may be ready for use as discussed elsewhere herein.

Further to the discussion above in connection with, e.g., operation 328 in process 320, the token map generator and/or other processor(s) may be configured to create a token map that can tokenize various sized PANs or portions thereof. For example, because token map 314 is shown as being configured to tokenize eight digits of a PAN, token map 314 is approximately 1,000,000,000 bytes in size (four bytes for each set of middle digits in middle digits column 406; four bytes for each token in token value column 404; and two bytes for the check digit value in check digits column 408). That is a total of ten bytes per row of token map 314. Ten (bytes per row)×100,000,000 (possible middle digits) would require less than one GB (which is typically $2^{30}$ or 1,073,741,824 bytes) of memory per token map as shown in FIG. 4. In other words, the middle digits may include 100,000,000 values (when comprised of eight digits). After converting each middle digit value and token value to a long (e.g., four byte) number, (100M×4 bytes+ 100M×4 bytes), results in approximately an 800 MB of memory requirement. Adding a two byte check digit, as shown in check digits column 408 of token map 314, can still enable a token map to be stored on less than approximately 1 GB of memory. The relatively low memory requirement (e.g., approximately 1 GB) for a credit card security database allows token map 314 to be kept in faster memory which may in turn facilitate faster processing (e.g., tokenizing and/or detokenizing) by, for example, server 104.

Token map 314 can also be generated to enable a detokenizer to execute a token-to-middle digits algorithm. For example, one at a time for each row, the token map generator (or other machine) can convert each token value to a corresponding array pointer. The token map generator can be configured to store the middle digits value in the resulting array location. Once complete, the token-to-middle digits mapping portion of token map 314 may also be complete and token map 314 may be ready for use without the check digits portion.

The check digits column 408 may be populated by going through the resulting token-to-middle digits portion of token map 314 and middle digits-to-token portion of token map 314, one row at a time, and using as inputs the token value and middle digits value of the same row. For example, check digit column 408 may be populated based upon the values in token value column 404 and middle digits column 406 that are associated with the same array location value. The check digit value can then be calculated by adding each digit to the next for all numbers in the token and middle digits. When eight digits are used in the middle digits, this will result in a number between 0 and 198 (9×16 digits), which can be stored in the corresponding array location row in the check digit portion of token map 314.

As mentioned above, in some embodiments, it is critical to protect the security of the final token map. For recoverability, multiple copies of the token map can exist, since the token map cannot be recreated due to its inherent randomness. Creating multiple copies can be accomplished in a number of ways. For example, the token map(s) can be replicated via a secure connection to one or more additional servers and/or other machines. This can keep the token map only in memory. As another example, the token map can be stored on removable memory (such as a disk, flash drive, DVD, etc.). The token map can be encrypted when copying the token map onto a disk that has adequate space and/or places the token map at a higher risk for theft and unauthorized access.

Once the token server is operational and the token map is loaded into the tokenizer's and/or the server's memory, looking up the token or middle digits can be executed using a direct memory access. For example, to convert middle digits to a token, the tokenizer can be configured to use the middle digits as a pointer to an array position and directly access a long integer (four bytes) which contains the corresponding token. To revert back to the initial middle digits, a token can be converted to the middle digits by using the token as the pointer for a direct memory access. Using the token as an array pointer and using the long integer at that location as the corresponding middle digits can allow some embodiments to implement direct memory access procedures. As such, access to the token and middle digits can be a direct memory access. No indexes, such as array location values, need to be created or read to find the corresponding item.

In embodiments where the token contains non-numeric characters, those tokens can be calculated at after retrieving a token or converting a token to a number prior to looking up the middle digits.

The check digit can also be based on a direct lookup, using the same multiplier and a different memory offset. For example, the check digit can be calculated and checked before any return to the calling application.

Because the creation of the token map can be separate from and/or prior to the operation of the tokenizer, there can be a division of responsibilities. For example, only the creator of the token map may know how the token map's creation was achieved. As such, the token map creation logic can be operationally separate from any of its server's other processing equipment and even be implemented on its own, dedicated server and/or other device.

Because token map 314 is created by, e.g., token map generator 318 and/or can otherwise be received by tokenizer 310 in its complete form prior to executing tokenization or detokenization (as opposed to being retrieved and/or added to each time a new credit card is initially used with a system) and because token map 314 can be configured to be stored in the server's faster-access memory (albeit often much smaller than slower-access memory), at least one type of legacy database may be omitted when implementing some embodiments of the present invention. Eliminating the dependency on the relatively large legacy databases (such as mainframe 114) and/or other persistent storage devices during normal credit card processing operations can increase performance and stability of server 104 and/or the entire credit card processing system.

The security provided by some embodiments may depend upon and/or be enhanced by the randomness of the token generation and security of token map 314. As mentioned above, the tokenizer, token generator and/or any other processor(s) can be configured to create random tokens and map the tokens to numbers prior to actually tokenizing a PAN. This differs from some traditional tokenization systems that use the randomness of credit card usage to assign tokens in a relatively large central database. However, unlike such temporal-based token assignment systems, because token maps in accordance with some embodiments discussed herein are matrices of the middle digits values and the token values, complete PANs do not need to be (although they could be) stored anywhere in systems in accordance with some embodiment. Furthermore, there is no need for some embodiments to (although some could) transmit complete PANs (tokenized, encrypted and/or otherwise) anywhere within the system (at least for the tokenization process). Similarly, there is no need to transmit a complete, untokenized PAN over public networks. PANs can be tokenized by the server that maintains the firewall for an intranet, as discussed above. Some token map embodiments discussed herein, can be used in combination with legacy systems, including temporal-based token assignment systems. Some token map embodiments may also be used to tokenize an encrypted PAN and/or other code.

Figure 3C:
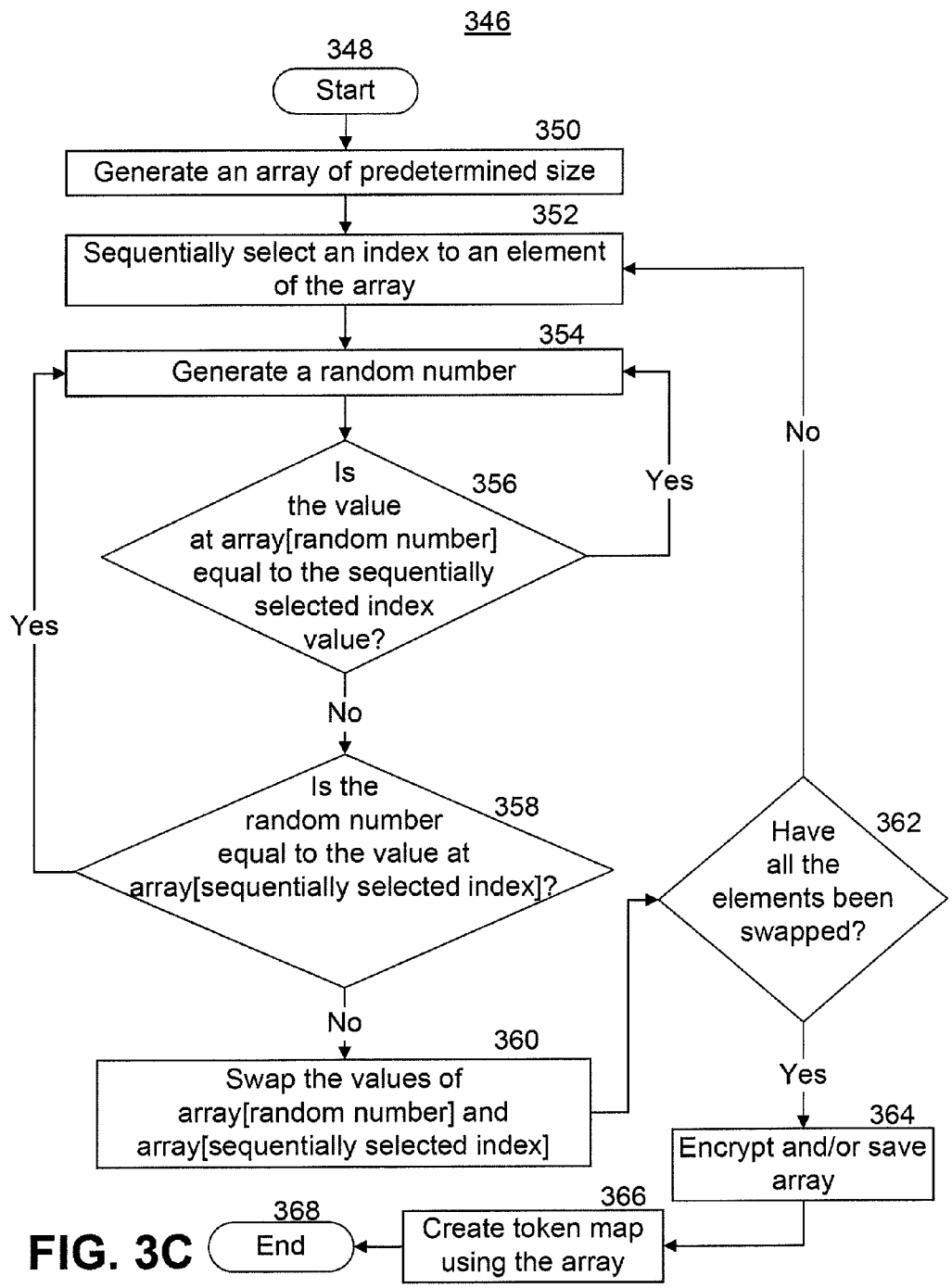

FIG. 3C shows another exemplary process, process 346, for generating a token map. FIG. 3C begins at 346. At 348, the processor (which may be comprised of more than one can physical component) can be configured to generate an array of a predetermined size (e.g., 100 million elements). The array may later be combined with one or more additional arrays to construct token map 314.

At 352, the processor can be configured to sequentially select an index to an array element. For example, the processor may be configured to loop through the array elements from smallest to largest.

At 354, the processor can be configured to generate a random number. For example, the processor may generate a random integer ranging from 1 to 100,000,000 inclusive. Any other bounds may be used, which may or may not be the same as the bounds used for the original array location values. The random number generator may be seeded at the start with the current time to obtain a unique random number that would be hard to duplicate. In some embodiments, a new seed may be introduced to the random number generator every predetermined number of iterations to further obscure the randomness.

At 356, the processor can be configured to determine whether the value assigned to the element located at the array element having an index equal to the random number is the same as the value of the sequentially selected index value. If the determination at 354 has affirmative result, process 346 returns to 354. If the determination has a negative result, process 346 proceeds to 358.

At 358, a determination is made as to whether or not the random number is equal to the value of the array at sequentially selected index. If the determination at 358 has affirmative result, process 346 returns to 354. If the determination has a negative result, process 348 proceeds to 360.

At 360, the value of the array at randomly element is swapped with value of the array at the sequentially selected element.

At 362, a determination is made as to whether or not all of the array elements have been involved in a swap. In response to determining at 362 that one or more elements have not been swapped (e.g., the processor has not looped through all 100 million elements), process 346 may return to 352 and repeat the steps discussed above until 362 has been satisfied.

In response to determining at 362 that all the elements have been involved in a swap (e.g., the loop is completed), process 346 may proceed to 364 and encrypt, save, transmit and/or otherwise output the completed the array.

At 366, a token map can be created by first generating a second array (e.g., the middle digits value array), initializing the array created using the previous steps of process 346, and then initializing second array using the following logic:

Second_array[first_array [index]]=index;
Second_array[first_array [0]]=0;
Second_array[5000]=0 (assuming value at first_array[0] is 5000);
Second_array[first_array[1]]=1 m;
Second_array[4000]=1 (assuming value first_array[1] is 4000).

Token Map may then contain the first and second arrays. In this example, the token array (e.g., first array) with token values is generated first and middle digits array is constructed using the token array values as its subscript values. Then the two arrays can be combined to create the token map.

Pre-Parsering

Before the token map is used to tokenize a PAN, some embodiments may include one or more pre-parser processors and/or other types of processor(s) that execute a pre-parser process, which can include locating, extracting, validating and outputting a PAN from data signals received by the server and/or other machine. In some embodiments, the pre-parser process may be performed by a physical component included in a server or other type of machine, a stand alone machine that processes data independent from other devices, software, firmware, and/or combination thereof. FIG. 5 shows an exemplary pre-parcer process, process 500, which starts at 502.

At 504, the processor may receive a message that may or may not include at least one PAN. The message may be received from, for example, known message-oriented middleware, such as IBM's MQSeries®. As another example, the message may be received in accordance with known protocols such as hypertext transmission protocol ("HTTP").

At 506, the processor can be configured to determine whether the message received at 504 has a length that is at least a predetermined number of characters. For example, the processor may be configured to determine whether the message is at least ten characters in length.

In response to determining at 506 that the message length is the predetermined number of characters or less (e.g., ten characters or shorter), process 500 proceeds to 508 and ends.

In response to determining at 506 that the message length is more than the predetermined number of characters (e.g., more than ten characters), the processor can be configured to search the message at 510 for a string of numeric digits having a length that is within a predetermined range (e.g., at least ten numeric digits and less than twenty numeric digits). Additional and/or different criteria may also be used at 510 by the processor.

At 512, the processor can be configured to determine whether a string of numeric digits of the appropriate length and/or otherwise meeting the criteria of 510 has been found in the message received at 504. In response to determining no such string of digits is included in the message, process 500 returns to 504. In response to determining that such a string of numeric digits is included in the message, the processor can be configured to extract the vendor code from the string of numeric digits at 514. The vendor code may be, for example, the first two, three or four numeric digits in the string. The vendor code may be a universal bank identifying number ("BIN").

At 516, the processor can be configured to determine the length of the string of numeric digits, which may include removing spaces, dashes, dots and other non-numeric characters that may have otherwise been included in the message's numeric string.

At 518, the processor can determine whether the length of the numeric digits corresponds with the length of a PAN associated with the vendor code. For example, an American Express BIN should be associated with a 15 digit numeric PAN, while a MasterCard BIN should be associated with a 16 digit numeric PAN. The test executed at 518 may be based on, for example, a finite list of BIN codes.

In response to determining at 518 that the length of the numeric digits does not correspond with the predetermined length of PAN associated with the vendor code, the processor may be configured to remove digits from the PAN. For example, the processor may remove digits representing the expiration date from the string of numeric digits.

At 522, a determination is made after the digits have been removed as to whether the length of the string of digits is still at least ten. In response to determining the string length is less than ten, process 500 returns to 504. In response to determining the string length is at least ten process 500 returns to 518.

After a determination is made at 518 that the string's length matches the length of a PAN associated with the vendor code, one or more confirmatory tests may be executed at 524. For example, the Luhn test can be executed at 524. A determination is then made at 526 as to whether or not the confirmatory test(s) passed or failed. In response to determining the confirmatory test(s) failed, process 500 returns to 504. In response to determining the confirmatory test(s) passed, process 500 proceeds to 528 and the processor masks the string of digits and logs the event. Process 500 then ends at 530 and, in some embodiments, the string of digits may be subsequently tokenized and/or otherwise processed by an electronic device.

Tokenization

The tokenization process can receive a PAN as an input and output a token. The tokenization process may be performed by one or more processors configured to function as a parser and a tokenizer. In some embodiments, the token can be generated using a token map, such as token map 314 discussed above. The token may uniquely represent the original PAN and be the same length as the original PAN. In some embodiments, the processor that executes the tokenization process may be parser hardware running a tokenizer application programming interface ("API").

A tokenizer API may receive, for example, a twelve to nineteen string of numeric digits from a pre-parser. If the tokenizer API receives non-numeric digits, the tokenizer API may be configured to generate an error. Other exemplary error conditions may include the string of digits having a length less than twelve (or any other minimum value) and a length greater than nineteen (or any other maximum value). In some embodiments, a tokenizer API may be a web API and/or be configured to accept one or more PANs in a single tokenization request. Below is an example of an XML payload that shows how multiple PANs can be passed to the tokenizer to create tokens.

```
<?xml version="1.0" encoding="UTF-8"?>
<soapenv:Envelope
Xmlns:soapenv="http://website1/">
<soapenv:Body>
<ns1:CreateTokensRQ xmlns:ns1="http://website2">
<ns1:Source ApplicationId>TEST</ns1:SourceApplicationId>
<ns1:PAN>5104000000000000</ns1:PAN>
<ns1:PAN>5104000000000001</ns1:PAN>
<ns1:PAN>5104000000000002</ns1:PAN>
</ns1:CreateTokenRQ>
</soapenv:Body>
</soapenv:Envelope>
```

Part of the original, untokeinzed PAN received by the tokenizer may remain in the tokenized PAN. For example, a suffix value (e.g., the last four characters of the untokenized PAN) and a prefix value (e.g., the first two to six characters, depending on the total size of the PAN) may remain the same in the tokenized PAN. The middle digits of untokenized PAN can be used as an index, pointer and/or basis for another type of linking mechanism to find a token in the token map. The token map may associate the value of the middle digits (sometimes referred to herein as the middle digits value) with a token, the token being a unique, randomized number. In addition, the value of the last four digits of the untokenized PAN can be summed with the token value retrieved from in the token map before outputting the token (e.g., before converting the token into a base36 representation) to make the token more unique to the original PAN (as opposed to all middle digits value being associated with the same token value by the same token map).

Figure 6:
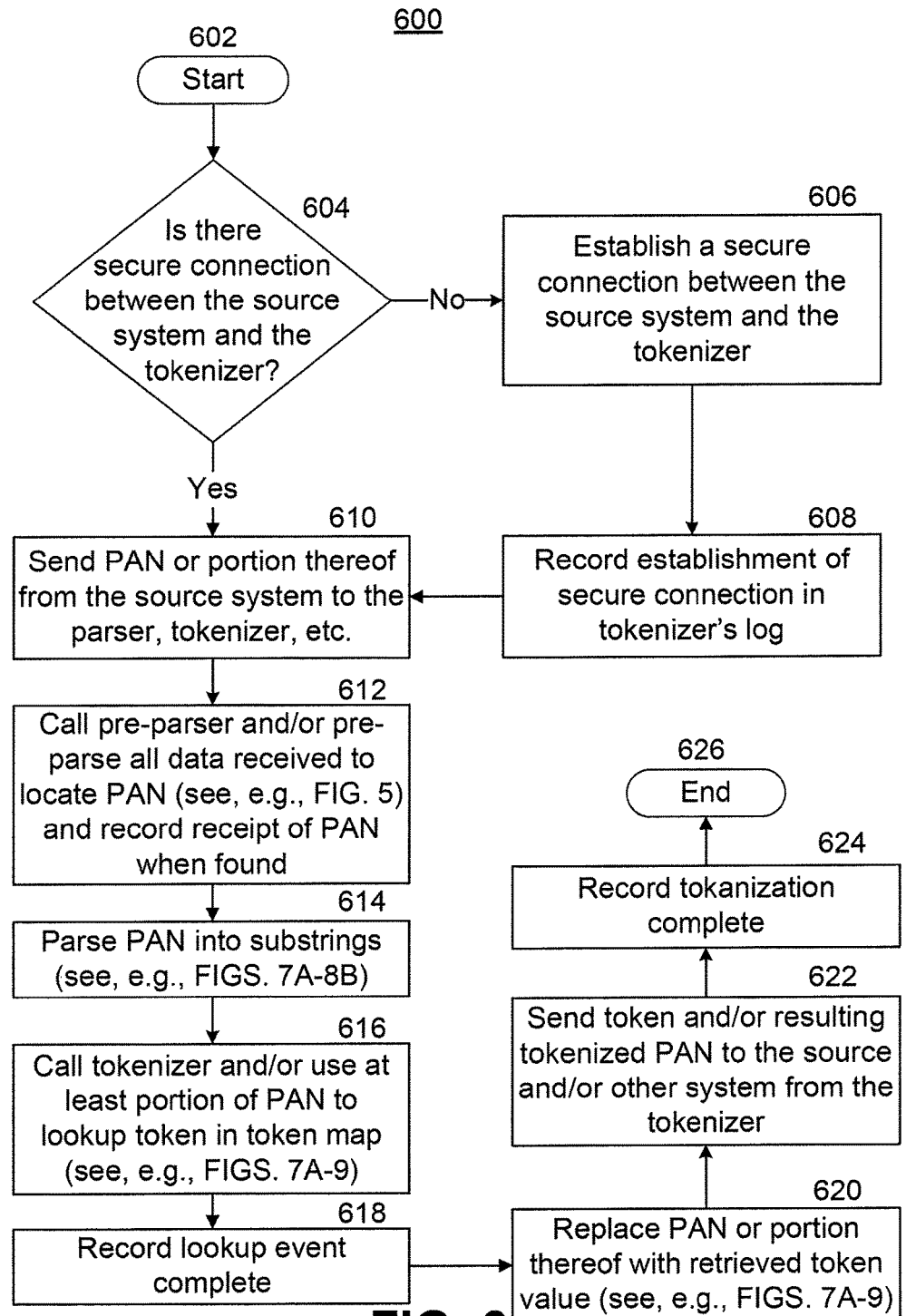
FIG. 6 shows a flow chart implementing an exemplary tokenization process in accordance with some embodiments of the present invention.

FIG. 6 shows a flow chart implementing an exemplary tokenization process, process 600, that may use token map 314 in accordance with some embodiments to tokenize a PAN by substituting at least a portion of the PAN with a token value. Process 600 starts at 602. At 604, a determination is made as to whether or not a mutually authenticated communications channel (such as, e.g., a SSL session) is currently established between the source system and the tokenizer, parser, and/or other processor executing process 600. Further to the discussion above, the processor may be an independent system component and/or independent system. The source device may include, for example, at least one peripheral, client device, server, and/or any other device that may receive and transmit a PAN to the processor. If such a communications channel does not exist, is about to expire and/or needs to be revalidated, the source system and the processor can be configured to establish a mutually authenticated communications channel at 606.

At 608, the processor can be configured to record in its log stored in a memory that the communications channel was successfully (or unsuccessfully) established. In some embodiments, the processor can be configured to log all tokenizing events, a subset thereof or no tokenizing events.

After determining at 604 that a secure connection exists between the processor and the source system or after 608, the PAN or a portion thereof is transmitted at 610 from the source device to the processor over the secure connection. For example, a client device (such as a credit card reader) may transmit the entire PAN and/or portion thereof. As another example, a server source device may be configured to pre-parse the message to locate a PAN (discussed in reference to FIG. 5), parse the PAN (discussed below) and/or transmit only the middle digits of the PAN at 610.

The processor can include and/or otherwise be communicatively coupled to a pre-parser that is configured to locate and extract PANs from data signals and/or other messages received from source devices and/or any other device. The pre-parser may be implemented as a dedicated physical component of the processor, as a separate machine, and/or as hardware, software and/or firmware. An exemplary pre-parsing process, which may be performed at 612, is discussed further in reference to, e.g., FIG. 5. Successful receipt and extraction of the sent PAN can also be recorded in the processor's log at 612.

At 614, a parser and/or other processor may parse the PAN into one or more substrings of characters. The parser may be implemented as a dedicated physical component of the processor, as separate machine, and/or as hardware, software and/or firmware. Additional examples relating to parsing, which may be performed at 614, are discussed further in reference to, e.g., FIGS. 7A through 9B. For example, the PAN may be parsed into a prefix string, middle string (sometimes referred to herein as the "middle digits"), and an end string sometimes referred to herein as the "suffix" and may comprise the last four characters of the PAN). The number of characters in each string may be predetermined or dynamically determined based on, e.g., the number of characters in the PAN received by the parser. This is discussed further in connection with FIG. 7C.

The middle digits of the PAN can be used at 616 to lookup a token value using token map 314. In some embodiments, such as when a parser is implementing process 600, a tokenizer may be called to execute 616. Additional examples relating to using the token map for tokenizing operations that are performed at 614 are discussed further in reference to, e.g., FIGS. 7A through 9C. Upon determining the tokenization lookup is complete, the event is recorded at 618 in the processor's log.

If the entire PAN was provided to the tokenizer, the middle digits value of the PAN can be replaced at 620 with the token and/or the resulting tokenized PAN can be transmitted back to the source system at 624. If only a portion of the PAN (such as the middle digits) was provided to the tokenizer, the tokenizer can be configured to transmit the token by itself back to the source system, and the source system (and/or any other device) can be configured to create the resulting tokenized PAN. After the source system and/or other machine receives the tokenized PAN, the source system and/or other machine may transmit the tokenized PAN over unsecured networks (as shown by some of source devices 102A and 102B communicating directing with internet 112 in FIG. 1) with less risk that the PAN will be stolen during transmission. The tokenizer can be configured to log whichever instructions it executes successfully or unsuccessfully at 624. Process 600 ends at 626.

FIGS. 7A and 7B show an exemplary credit card 700 that includes a 16 digit, base10 PAN ("1234567890123456"). As mentioned elsewhere herein, one skilled in the art would appreciate that embodiments of the present invention can be applied to any type of data based on any type of numerical system (including alphanumeric and/or other numerical systems, such as binary, hexadecimal, etc.).

In some embodiments, the PAN (including, e.g., a PAN signal or other type of message representing and/or including the PAN) of card 700 can be parsed by a parser and/or tokenizer, such as tokenizer 310, into three separate groups, e.g., prefix digits value 702, middle digits value 704 and suffix value 706. Suffix value 706 is shown in FIGS. 7A and 7B as comprising the right-most four digits of the PAN. Middle digits value 704 is shown in FIGS. 7A and 7B as comprising the eight digits preceding the last four digits. In some embodiments, the middle digits value may comprise more or less than eight digits. For example, the number of characters that are parsed out as a prefix value, middle digits value and/or suffix value may be based on the untokenized PAN length. FIG. 7C shows an exemplary table that correlates the untokenized PAN length to the length of the middle digits that are to be tokenized.

Prefix digits value 702 may include any digits preceding middle digits value 704 and can be a variable length depending on the length of the PAN. Additionally or alternatively, the length of prefix digits value 702 can be correlated to the length of middle digits value 704, suffix value 706, and/or any other character string received or created by the parser. This type of parsing can be used when, for example, the PAN number is determined to include at least a predetermined number of digits as discussed above.

In other embodiments, rather than use the middle eight digits, middle digits value 704 can be configured to include more or less digits. For example, when the PAN received from the source device consists of only six digits, middle digits value 704, which may be used to as the basis for generating a token, may include some or all of the six digits. As such prefix digits value 702 and the suffix value 706 may be omitted without departing from the spirit of the invention. As another example, when the PAN received from the source device includes nineteen digits, the PAN can be parsed such that middle digits value 704 includes more than eight digits while remaining consistent with embodiments of the present invention. Examples of a process that may be used to select the proper sized token based on the PAN's size are discussed further in connection with FIGS. 9A, 9B and 9C.

After middle digits value 704 has been populated, the tokenizer and/or any other processor configured to perform tokenization can be configured to replace the digits included in middle digits value 704 with a randomly created tokenized number. The tokenized PAN can then be saved in a payment card industry ("PCI") vault, which is configured to prevent unauthorized access of credit card data. The PCI vault can be implemented in the server's, mainframe's and/or other device's memory (e.g., memory 308), in a removable memory device, and/or at a remote location from the tokenizer. In some embodiments, to increase security, the PCI vault's functionality can be separated from the other functionality that may be provided by the server. The tokenized PAN can be the same number of digits as the original, untokenized PAN. As shown in FIG. 4B, after the tokenizing has been completed, the tokenized PAN may have the form "aaaaVVTTTTTTbbbb," wherein prefix value 702 of the tokenized PAN can be the same (i.e., "aaaa" will still be "1234") as the original PAN's untokenized prefix value, middle digits value 704 of the tokenized PAN can be replaced with a token map version identifier and token (as represented by VVTTTTTT), and suffix value 706 of the tokenized PAN can be the same (i.e., "bbbb" will still be "3456") as the untokenized PAN's suffix value.

In other exemplary embodiments, more (or less) of the PAN or other code can be replaced by a tokenizer in accordance with some embodiments discussed herein. In credit and debit card applications, for example, there are relatively few disadvantages, but unique advantages to only tokenizing some of the middle digits (such as eight or nine of the middle digits). For example, as noted above, the first four digits of a credit card number can be a vendor identifier used to identify the issuing banking or lending institution. The vendor's identity may also be apparent by the card's logo(s) and can be considered less important to a cyber criminal who is trying to identify a particular account number. Additionally, as discussed in greater detail elsewhere herein, tokenizing eight digits for example, even with a checksum bit, will only require about one GB of memory space to implement.

In FIG. 7B, "VV" of middle digits value 704 can represent, for example, the version identifier of the token map used by tokenizer 310 to tokenize the digits of middle digits value 704. The administrator of the tokenizing server, such as server 104, can automatically or manually initiate the generation of new or otherwise updated token maps as frequently as it is deemed necessary. In some embodiments, tokenizer 310, token map generator 318 and/or any other circuit can be configured to update token maps periodically (e.g., monthly, every so many months, yearly, every so many tokenizations, based on any other variable, etc.), randomly, in response to a triggering event (such as, e.g., detecting a suspected, probable or attempted cyber attack), or any combination thereof.

In some embodiments, tokenizer 310, token map generator 318 and/or any other circuit may be configured to always make the first digit of "VV" be a predetermined type of symbol (such as a letter, number and/or anything else). The symbol may be predetermined by, e.g., token map generator 318 and/or any other circuit based on the type and/or particular untokenized PAN. For example, if the PAN is determined to be a credit card number (or other string of at least nine numbers), the tokenizer may choose a token map having an identifier that starts with a letter and include the token map identifier in the tokenized PAN. This may aid in avoiding inadvertent errors by allowing a machine to quickly determine whether or not a received PAN is tokenized by examining the first two digits of middle digits value

704. For example, the Luhn test can be used to easily determine whether or not the PAN is tokenized (e.g., includes a token).

Using a single letter token map identifier can provide the system the ability to have 26 unique token maps. As another example, when a letter used for the first "V" of the token map identifier and an alphanumeric digit is used for the second "V" of the toke map identifier, the system may be provided the potential for 936 maps (26×36). Even when using a two digit token map identifier, at least six digits may be available to create a unique token.

When middle digits value 704 consist of eight digits, there would be 100,000,000 possible middle digits values. The 100,000,000 possible middle digits values require only six digits when using a base36 representation (such as alphanumeric representation, namely A through Z and 0 through 9). In other embodiments, rather than use the base36 representation for the middle digits, another type of numerical system can be used. For example, a base64 or other larger representation could be used, which would allow, for example, more token map versions to be used in accordance with some embodiments discussed herein. A four character, base64 (or larger) token map identifier may be used, thereby allowing for tens of millions (if not more) token maps to be in existence and used among millions of electrical devices. In some embodiments, every electrical device may have one or more of its own token maps assigned by a central system and/or generated locally by the electrical device. For example, a central system (such as server 104 and/or mainframe 114) may assign source device 102 a token map version identifier and provision source device 102 to generate its own token map. Source device 102 may then function as discussed in connection with, e.g., FIG. 3A and tokenize/detokenize PANs based upon its locally generated token map. Additionally or alternatively, tokenizer 310, token map generator 318 and/or any other circuit may be configured to always make the token map version identifiers have the same format. For example, the first character of "VV" may be a base64 character while the second digit of "VV" may be a base10 character.

In FIG. 7B, the token is represented by TTTTTT of middle digits 404. The token may be or otherwise comprise an eight byte number that has been randomly created to represent the middle digits originally populating middle digits 404.

Figure 8:
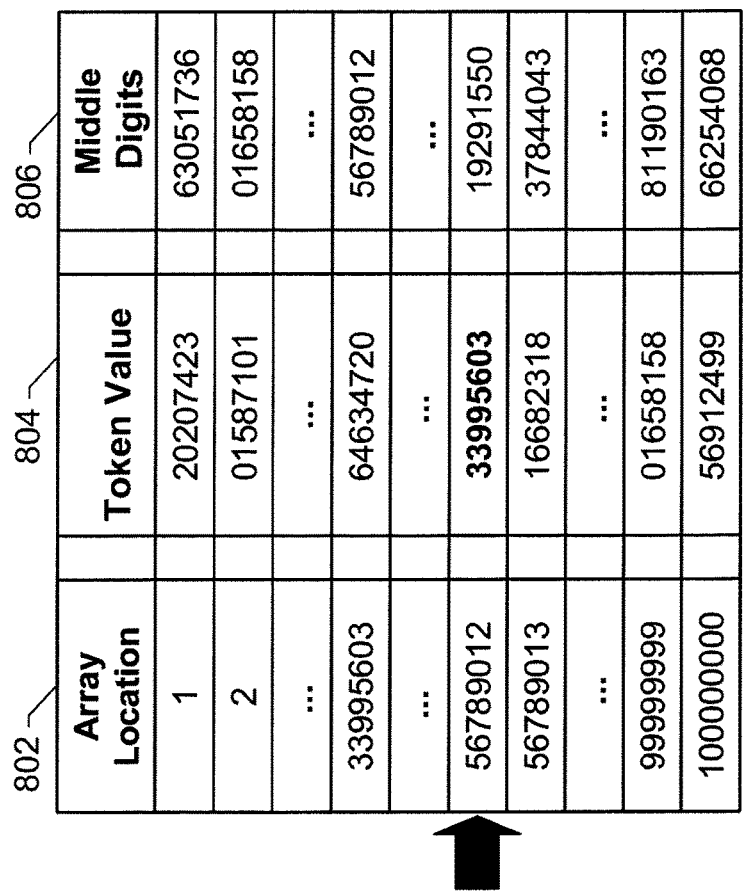
FIG. 8 shows a portion of a token map that may be used for tokenizing a PAN in accordance with some embodiments of the present invention.

FIG. 8 shows a portion of token map 314 that may be used to tokenize the PAN. For example, when the pre-parser identifies the PAN as "1234567890123456", the parser may identify the middle digits value as "56789012". When using version one of token map 314, a processor may select a row in token map 314 based on the array location value of array location column 802 matching the middle digits value extracted from the untokenized PAN. For example, the middle digits value may be used as a pointer to a memory address and/or otherwise used to represent a row based on the value of array location column 802. Once a row of token map 314 has been identified, the tokenizer can determine and extract the randomly assigned value in token value column 814 that is associated with the selected row, namely the row with the array location value that is the same as the PAN's middle digits value. In FIG. 8, the token value "33995603" is associated with array location value "56789012" (which was the same value as middle digits value of the untokenized PAN). The token value can be retrieved from token map 314 and converted (by the tokenizer, server processor, client processor, or any other machine) to a different numerical system (e.g., base36, base64, etc.) that requires less digits to represent the same value. In the example shown in FIG. 8, the base10 token value "33995603" can be further encrypted as the base36 token value "0K8N6B". After prefixing the token number with token map 314's version ID (e.g., version 1 can be represented by "A0"), the outputted token can be "A00K8N6B." Once the token is combined to the original prefix value of "aaaa" and suffix value of "bbbb" shown in FIGS. 7A and 7B, the resulting tokenized PAN can be: 1234A00K8N6B3456. In summary, some embodiments may generate the following data for an exemplary 16 digit PAN:

PAN: 1234567890123456;
BIN (Bank ID Number): 123456;
Middle digits value: 56789012;
Last digits (or suffix) value: 3456;
Token map version ID: 1 which may be coded as A0;
Token value (base36): 98765Z;
Tokenized PAN: 1234A098765Z3456;

In the above example, a portion of the six digit BIN has been tokenized.

As another example, some embodiments may generate the following data for an exemplary 12 digit PAN using a different, unique version of a table map:

PAN: 123456789012;
BIN value: 1234;
Middle digits value: 12345678;
Last digits value: 9012;
Token map version ID: R9;
Token value (base36): T54O62;
Resulting token: R9T54O629012;

In the preceding example, the entire BIN has been tokenized.

In some embodiments, an additional check digit process can be executed by the tokenizer and/or any other processor and used to ensure valid data in token map 314. Although the values associated with the check digit process are shown in FIG. 4, they have been omitted from FIG. 8 to avoid unnecessarily overcomplicating the discussion.

Multiple token maps can be kept in a server. Among other things, multiple token maps residing on the same server can allow versioning of the token map and token rotation. By pre-creating the token map (as discussed above) and storing each in memory, the server can be located in multiple locations facilitating disaster recovery, availability and global scalability for geographically diverse peripheral component interconnect ("PCI") operations.

In some embodiments, the operational server can also have a minimum amount of code to review and manage. Because no database is required in such embodiments and the full PAN is not stored at the server, the tokenization vault will need not contain any PCI data. Database to backup, restore, replicate or harden may not be required either. Additionally, a lock contention or duplicate key issues can be avoided when generating tokens or during operation.

The token map can be kept in hardware security module ("HSM") or secure universal serial bus ("USB") storage device. This is often more secure than a database as is traditionally done. If the token map needs to be expanded to allow for the middle digits to include, for example, nine digits instead of eight, then the size of the token map will increase to less than 10 GB, which is still small enough to fit into physical memory on most modern servers.

Figure 9A:
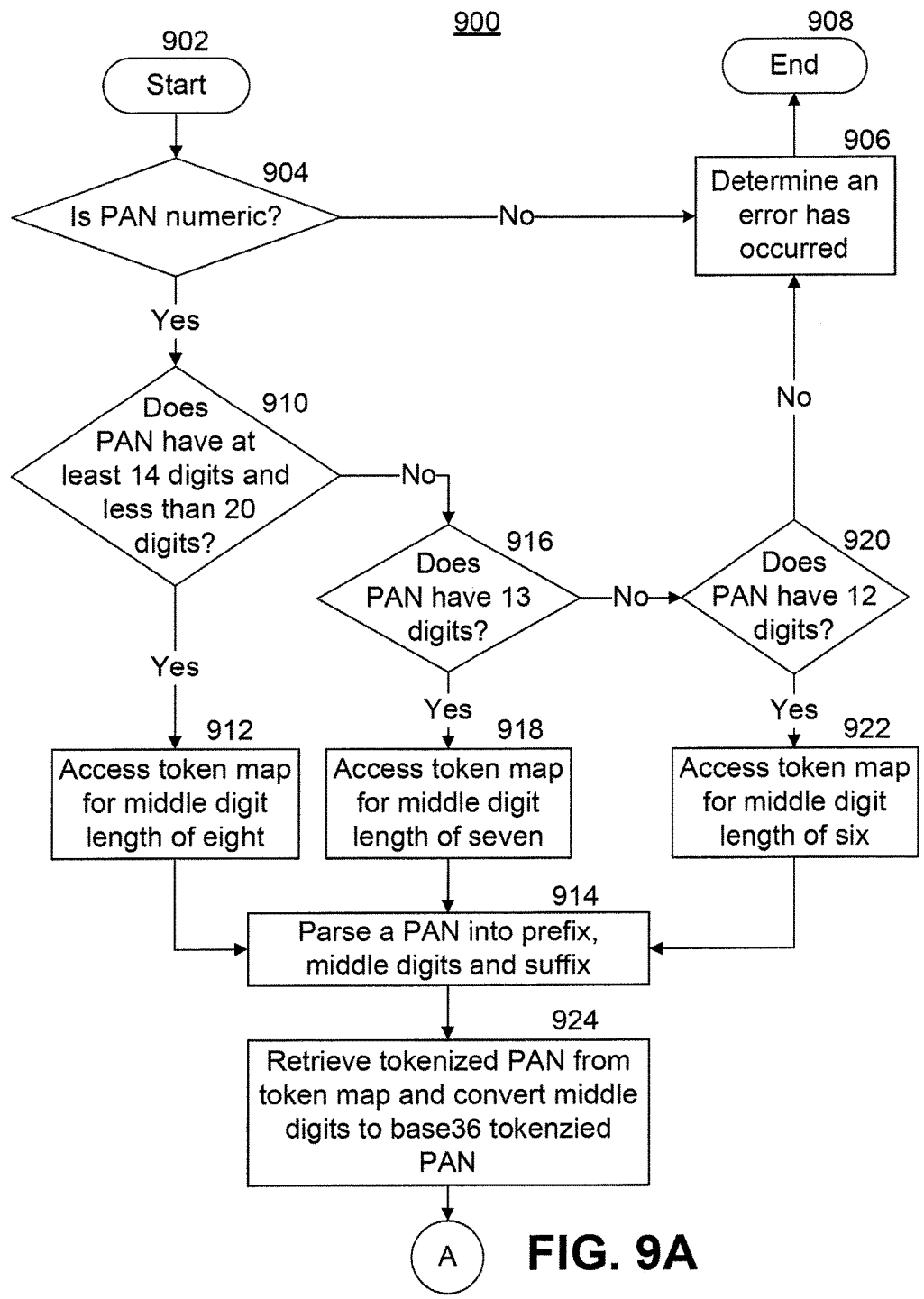
FIGS. 9A and 9B show a flow chart implementing an exemplary process for selecting a token map based on the length of the received PAN in accordance with some embodiments of the present invention.
Figures 9B, 9C:
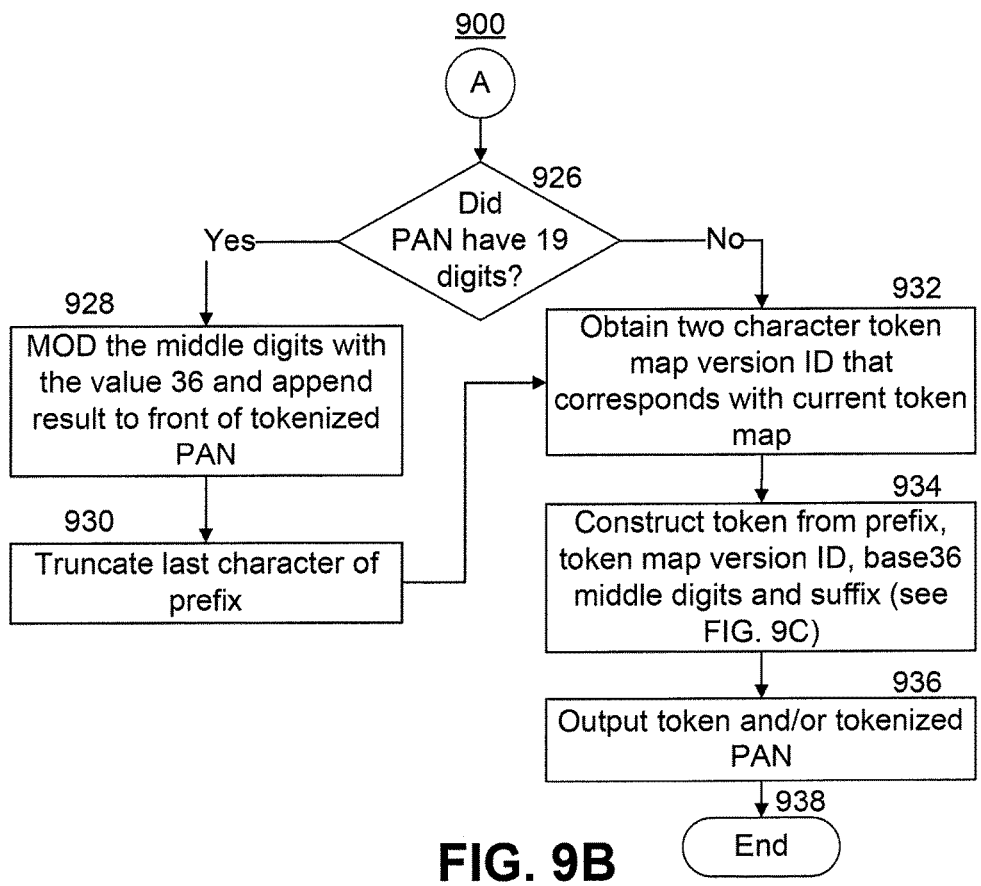
FIG. 9C shows a table that correlates various untokenized PAN lengths with various lengths of parts of a tokenized PAN in accordance with some embodiments of the present invention.

FIGS. 9A and 9B show exemplary method 900 that may be used by some embodiments to select a token map for tokenizing based on the length of the PAN. As mentioned in reference to, e.g., FIG. 7C, the length of the middle digits value that is tokenized may vary with the length of the entire PAN. This may allow, for example, the tokenized PAN to retain the same length as it was untokenized. Keeping the length of the tokenized PAN the same may aid in enabling some embodiments to be backwards compatible with existing systems. Process 900 starts at 902.

At 904, a determination is made as to whether or not the PAN comprises a string of numeric characters. In response to determining that the PAN is not numeric, the processor may determine at 906 that an error has occurred and process 900 ends at 908.

At 910 a determination is made as to whether or not the PAN has at least fourteen numeric digits and less than twenty numeric digits. In response to determining at 910 that the PAN does have at least fourteen numeric digits and less than twenty numeric digits, the processor can access (e.g., retrieve, decrypt, etc.) the token map configured for tokenizing middle digits values having a length of eight digits.

In response to determining at 910 that the PAN does not have at least fourteen numeric digits and less than twenty numeric digits, the processor can be configured to determine at 916 whether the PAN has thirteen digits. In response to determining at 916 that the PAN does have thirteen numeric digits, the processor can access, at 918, the token map configured for tokenizing middle digits values having a length of seven digits.

In response to determining at 916 that the PAN does not have thirteen numeric digits, the processor can be configured to determine at 920 whether the PAN has twelve digits. In response to determining at 920 that the PAN does not have twelve numeric digits, process 900 may proceed to 906 and determine an error has occurred. In response to determining at 920 that the PAN does have twelve numeric digits, the processor can access, at 922, the token map configured for tokenizing middle digits values having a length of six digits.

In some embodiments, rather than or in addition to determining the length of the PAN, the processor may be configured to determine the length of the middle digits value received from a source device, pre-parser, and/or any other device. The length of a received middle digits value may be used to select a token map.

After 912, 918 or 922, process 900 may proceed to 914 and parse the PAN into a prefix (e.g., first four digits), middle digits value and suffix value (e.g., last four digits). The length of the prefix value, middle digits value and/or suffix value may be dependent on the total length of the PAN.

At 924, the processor can be configured to retrieve the tokenized PAN based upon the parsed out middle digits value (as discussed above in connection with, e.g., FIG. 8) and convert the tokenized middle digits value to a base36 numerical system representation. In some embodiments, another numerical system can be used, which represents the middle digits value with less characters than a base10 numerical system.

Process 900 continues in FIG. 9B. At 926, a determination is made as to whether or not the PAN had nineteen numerical digits before at least a portion of it (e.g., the middle digits) was converted to base36. In response to determining the PAN consisted of nineteen numerical digits, the processor may be configured to compute the modulus 36 of the middle nine digits value and use the solution as the ninth digit in the middle digits value. As such, this will satisfy the current PCI guideline that requires no more than ten of the original digits remain the same (e.g., untokenized, unencrypted, etc.) when obscuring an original credit card PAN. At 930, the processor can be configured to truncate the last character of the prefix.

In response to determining at 926 that the PAN does not consist of nineteen numerical digits, the processor may be configured to obtain a token map version ID at 932. The token map version ID may comprise any number of characters. For example, two characters may be used as a token map version ID. The token map version ID may be obtained at any time, including after 930.

The token may then be constructed at 934 by combining the original prefix value, the token map version ID, the base36 representation of the middle digits value and the suffix value. This is discussed further in connection with, e.g., FIGS. 7A, 7B and 7C. Additionally, the tokenized PAN may be constructed in accordance with the table shown in FIG. 9C. FIG. 9C shows a table that correlates the size of the various components of tokenized PAN to the original PAN. The size of the middle digits value may be the sum of the length of the token map version identifier and the length of the tokenized Base36 value.

At 936, the token and/or tokenized PAN may be outputted at 936, and process 900 ends at 938.

Detokenization

A tokenized PAN may be transmitted among computing devices and across networks by legacy systems without risking the entire account number being stolen. Similarly, token maps that include only a portion of an account number may be transmitted across networks without risking entire PAN's being stolen. When token maps are transmitted, they may also be transmitted using known security algorithms. The token maps, such as token map 314, may be used to detokenize a tokenized PAN. Detokenization may be required to enable a merchant and/or other entity to be able to provide the actual PAN to a credit card company, such that the merchant and/or other entity is able to receive payment from the credit card company.

The detokenization process may be performed by one or more processors configured to function as a parser and detokenizer. In some embodiments, the one or more processors that execute the detokenization process may be hardware running a detokenizer application programming interface ("API") in an enterprise's secure vault. Any access to the detokenizer may be made over a secure network connection.

A detokenizer API may receive, for example, a string including a sequence of twelve to nineteen character tokenized PAN. The detokenizer API will be passed a 12 to 19 digit number by reference and change it to its token value. Two or more versions of the detokenize call may be implemented. For example, one call may be implemented for ASCII data and another call for EBCDIC data. The detokenizer web service interface can be configured to accept one or more tokens in a single request. Below is an example XML Payload that shows how multiple tokens can be passed to the detokenizer in single request.

```
<?xml version="1.0" encoding="UTF-8"?>
<soapenv:Envelope
xmlns:soapenv="http://website1/">
<soapenv:Body>
<ns1:GetPANsRQ xmlns:ns1="website2">
<ns1:SourceApplicationId>Detokenize</ns1:SourceApplicationId>
<ns1:Token>375AC11RJDQ2553</ns1:Token>
<ns1:Token>455AC11RJDQ2545</ns1:Token>
</ns1:GetPANsRQ>
</soapenv:Body>
</soapenv:Envelope>
```

Figure 10:
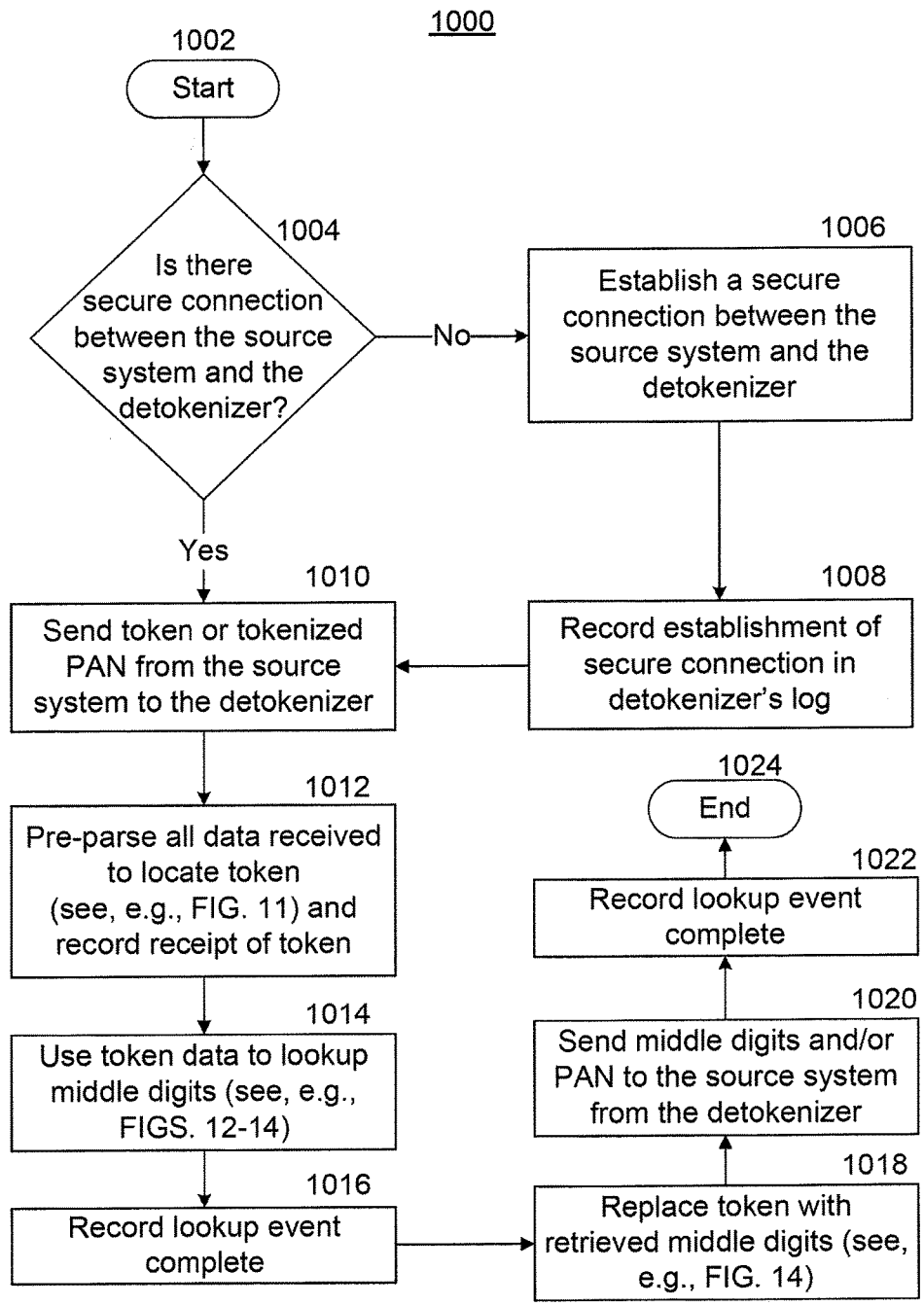
FIG. 10 shows a flow chart implementing an exemplary detokenization process in accordance with some embodiments of the present invention.
Figure 11:
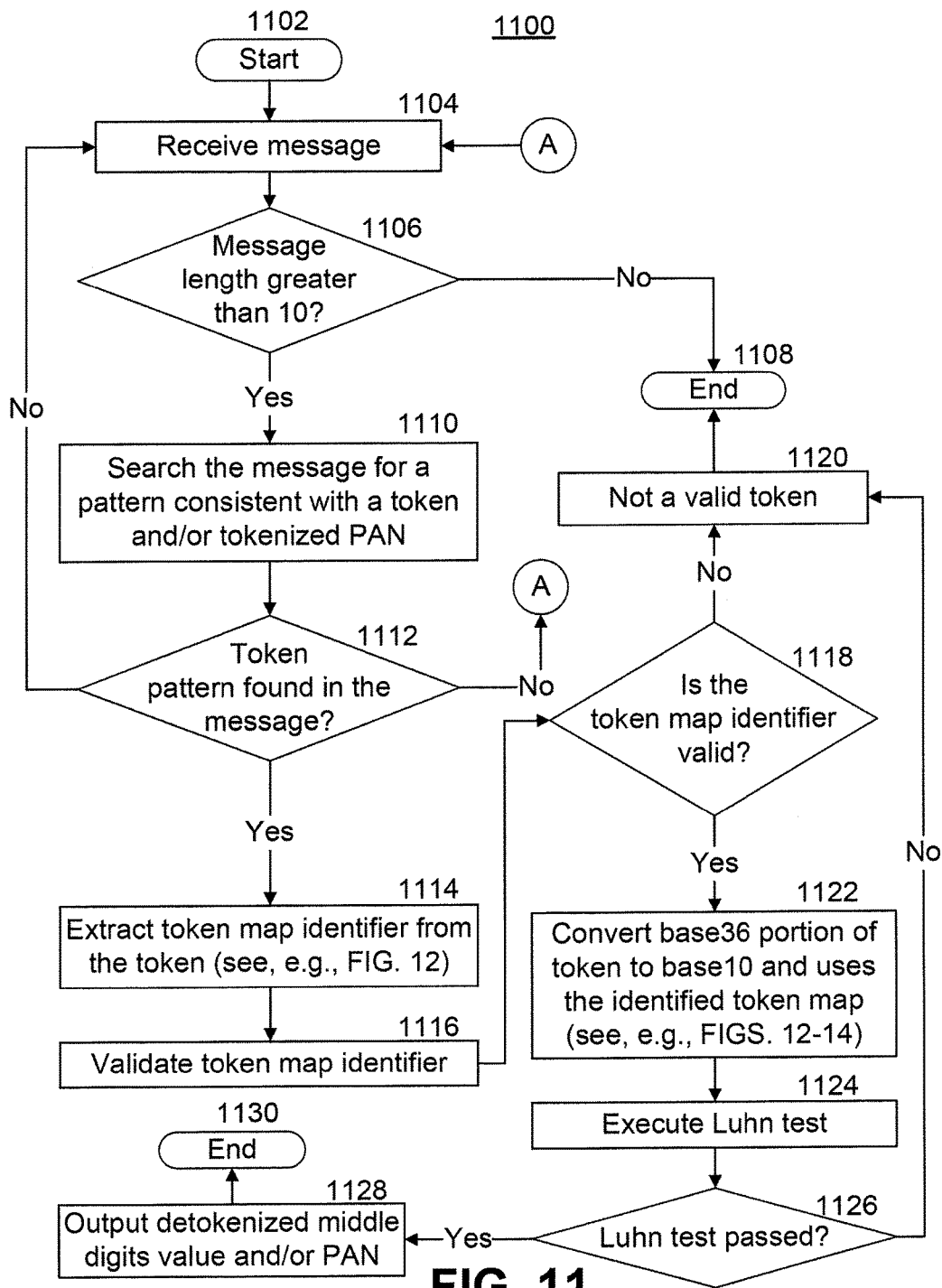
FIG. 11 shows a flow chart implementing an exemplary detokenization pre-parser process in accordance with some embodiments of the present invention.

FIG. 10 shows a flow chart implementing an exemplary detokenization process, process 1000, that may use a token map (such as token map 314) in accordance with some embodiments to detokenize a tokenized PAN by enabling a detokenizer and/or other device to substitute the token of the tokenized PAN with the original string of middle digits. In some embodiments, the detokenizer may be the same device and/or component as the tokenizer. Additionally or alternatively, the detokenizer may be implemented as a dedicated physical component of another machine, as separate machine, and/or as hardware, software and/or firmware. Process 1000 starts at 1002.

At 1004, a determination is made as to whether or not a mutually authenticated communications channel (such as, e.g., a SSL session) is currently established between the detokenizer and the source system (e.g., source device, server, and/or any other device providing a tokenized PAN for decryption). The detokenizer may include PCI vault. If such a communications channel does not exists, is about to expire and/or needs to be revalidated, the source system and the detokenizer can be configured to establish a mutually authenticated communications channel.

At 1008, the detokenizer can be configured to record in its log that the secure communications channel was successfully (or unsuccessfully) established. The detokenizer can be configured to log all detokenizing events or a subset thereof.

After determining that a secure connection exists between the detokenizer and the source system, the token or the entire tokenized PAN is transmitted at 1010 from the source system to the detokenizer over the secure connection. For example, a source device (such as a laptop computer) may be configured to send the whole tokenized PAN (e.g., after determining the communications will take place behind a firewall or are otherwise secured), whereas a server or other publicly available apparatus may be configured to send only the token.

Upon receiving data that may or may not include the token or tokenized PAN, the detokenizer may be configured to locate the token in the stream of data. An exemplary token-locating process, which may be performed at 1012, is discussed further in reference to, e.g., FIG. 11. Successful receipt of the sent token can be recorded in the detokenizer's log at 1012.

The token is used at 1014 to lookup the middle digits, an example of which is discussed below in connection with FIGS. 11 through 14. Upon determining the lookup is complete, the event is recorded in the detokenizer's log at 1016.

If the entire resulting token was provided to the detokenizer, the token is replaced at 1018 with the middle digits and the entire detokenized PAN is returned to the source system at 1020. An exemplary process for replacing the token with the original middle digits value is discussed in connection with, e.g., FIG. 14. If only the token was provided to the detokenizer, the detokenizer can be configured to send at 1020 the middle digits to the source system, and the source system (e.g., its processor and/or other circuitry) can be configured to reassemble the PAN. Regardless, the detokenizer can be configured to log whichever instructions it executes successfully or unsuccessfully at 1022. Process 1000 ends at 1024.

Further to the discussion of 1012, the detokenizer may include and/or other was be connected to a detokenizer pre-parser. The detokenizer pre-parser may be configured to extract a token from a message, identify a token map identifier and/or confirm the token map identifier is valid, among other things. In some embodiments, the detokenizer pre-parser may be a physical component included in a server or other type of machine, a stand alone machine that processes data independent from other devices, and/or any other software, firmware, and/or combination thereof. The detokenizer pre-parser may be configured to execute process 1100 shown in FIG. 11, which starts at 1102

At 1104, the detokenizer pre-parser may receive a message that may or may not include at least one token and/or tokenized PAN. The message may be received from, for example, known message-oriented middleware, such as IBM's MQSeries®. As another example, the message may be received in accordance with known protocols such as hypertext transmission protocol ("HTTP").

At 1106, the processor can be configured to determine whether the message received at 1104 has a length that is at least a predetermined number of characters. For example, the processor may be configured to determine whether the message is at least ten characters in length.

In response to determining at 1106 that the message length is the predetermined number of characters or less (e.g., ten characters or shorter), process 1100 proceeds to 1108 and ends.

In response to determining at 1106 that the message length is more than the predetermined number of characters (e.g., more than ten characters), the processor can be configured to search at 1110 for a pattern consistent with a token and/or tokenized PAN. For example, a token may have the following pattern: P[2-6N]V[CN]B36[4-7A]S[4N]. In other words, the pattern may include a prefix ("P") that is two to six base10 numeric characters ("N") in length, a token map version identifier ("V") that is one character ("C") and one numeric character, a base36 ("B36") token that is four to seven alphanumeric characters ("A") in length, and a suffix ("S") that is four numeric characters in length.

At 1112, the processor can be configured to determine whether a string of characters of the appropriate length and/or otherwise meeting the criteria of 1110 has been found in the message received at 1104. In response to determining no such string of characters is included in the message, process 1100 returns to 1104. In response to determining that such a string of numeric characters is included in the message, the processor can be configured to extract the token map version identifier from the token at 1114. Examples of the token map version identifier are discussed above and an exemplary process for extracting a token map identifier is discussed in reference to, e.g., FIG. 12.

At 1116, the processor can be configured to validate the token map version identifier. At 1118, in response to determining the token map version identifier is invalid, process 1100 proceeds to 1120 and records a log event that indicates there is no valid token in the message and process ends at 1108. Any token with an error may not be replaced in the string but an error code may be returned.

In response to determining the token map version identifier is valid, process 1100 proceeds to 1122 and converts the base36 (or other numerical system) portion(s) to base10. After the conversion, the base10 version of the token can be used to locate a middle digits value in the token map, some examples of which are discussed in reference to FIGS. 12-14. In some embodiments, the token map may store a base36 number and the conversion from base36 to base10 (and/or any other type of conversion) may be performed after retrieving the middle digits value from the token map.

At 1124, the Luhn test is executed. A determination is then made at 1126 as to whether or not the Luhn test was passed or failed. In response to determining the Luhn test failed, process 1100 returns to 1120. In response to determining the Luhn test passed, process 1100 proceeds to 1128 and the processor outputs the detokenized middle digits value and/or the entire detokenized PAN for transmission to the source device and/or any other electrical device. Process 1100 then ends at 1130.

Figure 12:
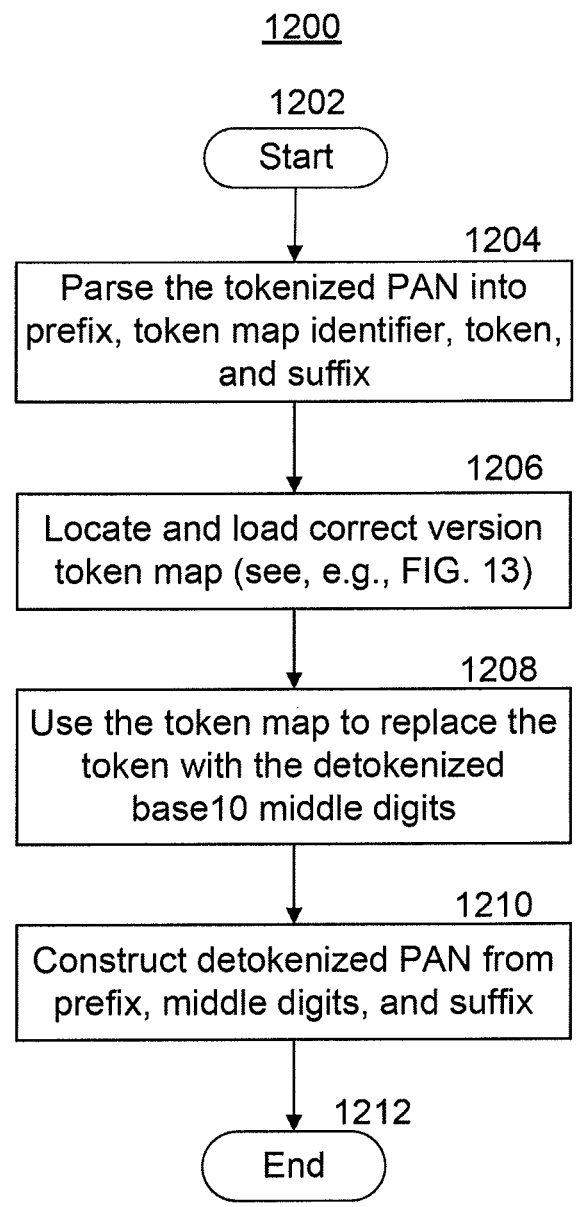
FIG. 12 shows a flow chart implementing an exemplary process for extracting a token map version identifier from a tokenized PAN in accordance with some embodiments of the present invention.

Further to the discussion of 1114, FIG. 12 shows an exemplary process, process 1200, that may be used to extract a token map identifier from the token. Process 1200 starts at 1202.

At 1204, the processor, which may be detokenizer parser's processor and/or any other type(s) of processor(s), parses the tokenized PAN into a prefix, token map version identifier, token and suffix.

At 1206, the processor can be configured to locate and load the correct version of the token map. An exemplary process that may be used to locate and load a token map for detokenizing is discussed in reference to FIG. 13.

At 1208, the token map can be configured to replace the token with the detokenized base10 middle digits value. And at 1210, the processor can be configured to insert the detokenized middle digits value in between the prefix and suffix portions of the tokenized PAN to construct the detokenized PAN. Process 1200 ends at 1212.

Figure 13:
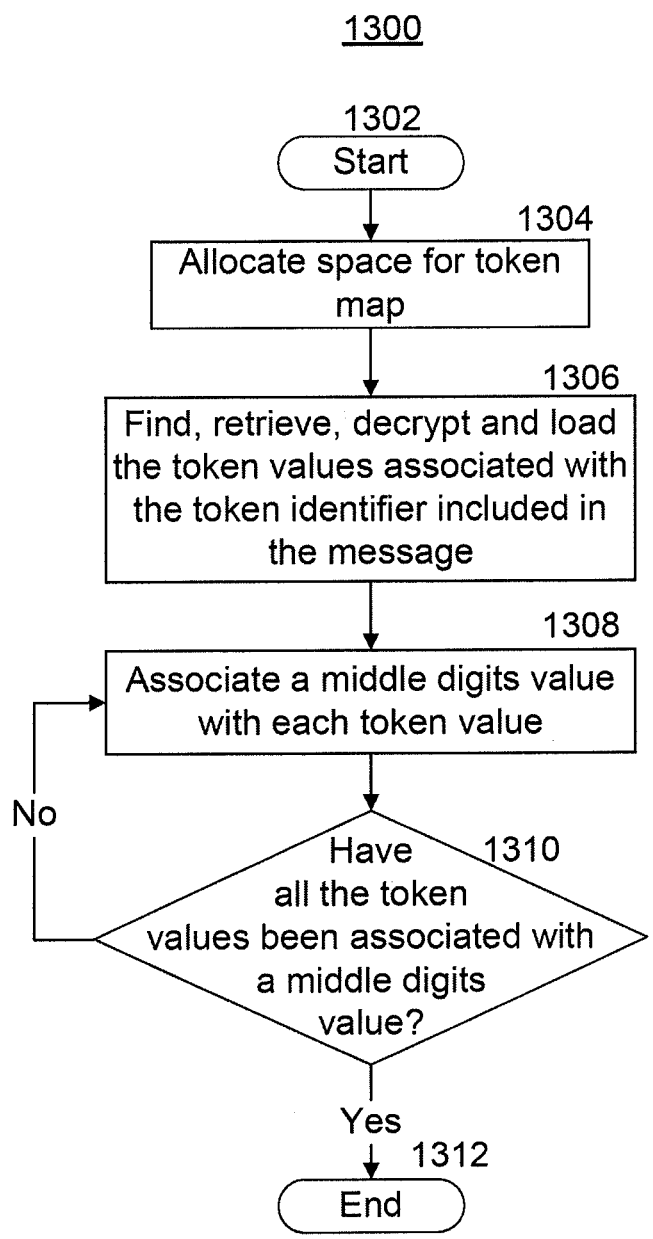
FIG. 13 shows a flow chart implementing an exemplary process for building a token map for detokenization in accordance with some embodiments of the present invention.

Further to the discussion of 1122 and 1206, FIG. 13 shows an exemplary process, process 1300, that may be used to build a token map for detokenization. Process 1300 may be used when, for example, the detokenizer may need to load multiple versions of the previously rendered token map. The location of the token maps can be identified though, e.g., an application configuration, system environment variables and/or a default location. It may be necessary to have the ability to dynamically load token maps without having to restart the process, so that a new version can be deployed without service interruption.

As mentioned above, to protect the contents of the token map, the token map should be encrypted. The detokenizer and/or other system component(s) can be configured to decrypt the token map and read it into memory. For example, 400 MB may be required for a token map that accommodates $10^8$ integers. By convention the token map file name may contain two bytes that correspond with the token map version identifier used to create the token being detokenized. Process 1300 starts at 1302.

At 1304, the processor, which may be detokenizer's processor and/or any other type(s) of processor(s), can allocate memory space for the token map. At 1306, the token map can be found based upon the token version identifier that was previously parsed from the token. The identified token map may then be retrieved from memory and/or a remote device and decrypted, if necessary. The identified token map may not need to be retrieved if already present in the systems active memory. The token values of the retrieved token map may then be loaded into the space that was allocated at 1304. At 1308, the processor can be configured to associate a detokenized middle digits value with each token value retrieved at 1306.

A determination may be made at 1310 as to whether all of the token values. Process 1300 repeats 1308 until the token map has been populated enough to complete a detokenization process. Process 1300 then ends at 1312.

FIG. 14 shows a portion of token map 314 that may be generated as discussed above and used to facilitate detokenizing the token and/or tokenized PAN. The tokenized PAN may be: "1234A00K8N6B3456". The middle digits value of the tokenized PAN, namely "A00K8N6B", may represent the token. The token map identifier in this example is "A0", which can be interpreted by a processor to mean version 1 is the token map needed to detokenize this token. The token, therefore, is the remaining six TTTTTT digits, namely "0K8N6B" in this example. By converting these six digits from Base36 to decimal, "0K8N6B" becomes "33995603". The decimal value "33995603" can be used by the processor as the array location (which could be a pointer value) to lookup the middle digits value in middle digits column 1406. That array location value points to the corresponding original middle digits "56789012". After replacing the token with the retrieved middle digits between the original "aaaa" (sometimes referred to as the prefix value) and "bbbb" (sometimes referred to as the suffix value), the PAN is restored as "1234567890123456". In some embodiments, a check digit process can be calculated to validate the data integrity of token map 314 and confirm that there was no data corruption.

Conclusion

Embodiments of the present invention may be implemented by various means, such as hardware, firmware, processor, circuitry and/or other devices associated with execution of software including one or more computer program instructions. For example, one or more of the procedures or activities described above may be embodied by computer program instructions. In this regard, the computer program instructions which embody the procedures or activities described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the corresponding procedure or activity. These computer program instructions may also be stored in a computer-readable storage memory (as opposed to a computer-readable transmission medium such as a carrier wave or electromagnetic signal) that may direct a computer or other programmable apparatus to function in a particular manner, such that the instructions stored in the computer-readable memory produce an article of manufacture the execution of which implements the function specified in the corresponding procedure or activity. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the corresponding procedure or activity described above.

Also, the terms "substantially," "about," "approximately" or the like as used herein are intended to reflect variances in a value or relationship that may be due to various factors such as the effects of environmental conditions, common error tolerances, or the like. It should further be understood that although some values or other relationships may be expressed herein without a modifier, these values or other relationships may also be exact or may include a degree of variation due to various factors such as the effects of environmental conditions, common error tolerances, or the like.

Many modifications and other embodiments of the inventions set forth herein will come to mind to one skilled in the art to which these inventions pertain having the benefit of the teachings presented in the foregoing descriptions and the associated drawings. For example, although much of the foregoing discussion is focused on tokenizing middle digits values and not tokenizing prefix values and suffix values, any segment or segments of a PAN or other type of code may be tokenized, while one or more other segments remain untokenized. In some embodiments, rather than tokenize a middle digits value (comprised of digits in the middle of a PAN), a tokenizer may tokenize a "targeted value" that may be comprised of one or more characters throughout the PAN. The targeted value may include, for example, two or more characters or segments of characters that are located next to each other, characters dispersed individually throughout the PAN, and/or any combination thereof. Like the middle digits values discussed above, some embodiments may or may not define the targeted value based on character(s) predetermined location(s) within a given PAN. Similarly, rather than not tokenizing a prefix value (located before a targeted value segment of characters) and/or suffix value (located after a targeted value segment of characters), some embodiments may have one or more "non-targeted values" that, like the prefix and suffix values discussed above, remain untokenized in a tokenized PAN. Likewise, rather than replace a token with a middle digits value during detokenization, the token may be replaced with targeted value. In this regard, a token map may be generated to associate token values with targeted values and targeted values with token values. Non-targeted values may also remain the same when a tokenized PAN is being detokenized. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method of tokenizing an account number for protecting the account number from cyber attackers, using at least one hardware processor, the computer-implemented method comprising: receiving, at a server from within a firewall perimeter, a message, the message comprising an untokenized account number; determining, by the at least one hardware processor, that the message includes the untokenized account number; determining a length of the untokenized account number; selecting a token map, wherein selecting the token map is based on the length of the untokenized account number in an instance in which the length of the untokenized account number minus a predetermined minimum length meets a predefined threshold, and wherein selecting the token map is based on a truncated untokenized account number in an instance in which the length of the untokenized account number minus the predetermined minimum length fails to meet the predefined threshold; determining a size of a targeted segment based on the length of the untokenized account number; extracting the targeted segment from the untokenized account number; generating a tokenized account number by replacing the targeted segment with a token value and a token map version identifier associated with the token map; and transmitting, via a network outside of the firewall perimeter, the tokenized account number.

2. The computer-implemented method of claim 1 further comprising:
receiving a second message, the second message comprising a second untokenized account number;
determining that the second message includes at least a first predetermined number of characters;
determining that the second message includes the second untokenized account number;
determining a second length of the second untokenized account number;
locating a vendor code within the second untokenized account number;
extracting the vendor code;
analyzing the vendor code to determine an expected length of the second untokenized account number; and
determining whether the second length of the second untokenized account number is the same as the expected length.

3. The computer-implemented method of claim 2 further comprising executing a Luhn test after determining the second length of the second untokenized account number is the same as the expected length.

4. The computer-implemented method of claim 3 further comprising providing the second untokenized account number to a parser after determining the second length is the same as the expected length.

5. The computer-implemented method of claim 2 further comprising removing digits from the second untokenized account number to define a new length after determining the second length of the second untokenized account number is different than the expected length.

6. The computer-implemented method of claim 5 further comprising:
determining a new length of the second untokenized account number after the digits are removed; and
determining whether the new length of the second untokenized account number is the same as the expected length.

7. The computer-implemented method of claim 5 further comprising providing the second untokenized account number to a parser after determining the new length is the same as the expected length.

8. The computer-implemented method of claim 5, wherein the digits that are removed represent an expiration date associated with the second untokenized account number.

9. A computer-implemented method of tokenizing an account number for protecting the account number from cyber attackers, using at least one hardware processor, the computer-implemented method comprising:
receiving, at a server from within a firewall perimeter, a message, the message comprising a tokenized account number;
searching, by the at least one hardware processor, for a token pattern in the message,
wherein searching for the token pattern in the message comprises:
identifying a prefix portion, the prefix portion identifying a presence of a token and indicative of a first character of the token;
identifying a second portion, the second portion being a token map identifier configured to identify a token map and a version of the token map utilized in creation of the token; and
identifying a third portion, the third portion representing a tokenized portion;
finding the token pattern in the message;
after finding the token pattern in the message, locating the tokenized account number;
parsing the token, including the prefix portion, the second portion, and the third portion, from the tokenized account number;
extracting the token map identifier from the token;

retrieving the version of the token map based on the token map identifier;
extracting the tokenized portion from the token;
utilizing the tokenized portion to identify a targeted segment, the targeted segment being a de-tokenized string of characters stored within the token map associated with the tokenized portion; and
replacing the token including the prefix portion, the second portion, and the third portion, with the targeted segment in the tokenized account number.

10. The computer-implemented method of claim 9 further comprising validating the token map identifier before retrieving the token map.

11. The computer-implemented method of claim 9 further comprising converting the token to a base10 number.

12. The computer-implemented method of claim 11 further comprising executing a Luhn test after converting the token to the base10 number.

13. The computer-implemented method of claim 11 further comprising using the token map to locate the targeted segment.

14. The computer-implemented method of claim 9 further comprising:
parsing a prefix from the tokenized account number; and
parsing a suffix from the tokenized account number.

15. A system of tokenizing an account number for protecting the account number from cyber attackers, using at least one hardware processor, the system comprising: an apparatus comprising the at least one hardware processor and at least one memory including computer program code, the at least one memory and the computer program code configured to, with the processor, cause the apparatus to at least: determine, by the at least one hardware processor, that a message includes an untokenized account number; determine a length of the untokenized account number; select a token map wherein selecting the token map is based on the length of the untokenized account number in an instance in which the length of the untokenized account number minus a predetermined minimum length meets a predefined threshold, and wherein selecting the token map is based on a truncated account number in an instance in which the length of the untokenized account number minus the predetermined minimum length fails to meet the predefined threshold; determine a size of a targeted segment based on the length of the untokenized account number; extract the targeted segment from the untokenized account number; generate a tokenized account number by replacing the targeted segment with a token value and a token map version identifier associated with the token map; and transmit via a network outside of the firewall perimeter, the tokenized account number.

16. The system of claim 15, wherein the at least one memory and the computer program code are further configured to, with the at least one hardware processor, cause the apparatus to: receive a second message, the second message comprising a second untokenized account number; determine that the second message includes at least a first predetermined number of characters; determine that the second message includes the second untokenized account number; determine a second length of the second untokenized account number; locate a vendor code within the second untokenized account number; extract the vendor code; analyze the vendor code to determine an expected length of the second untokenized account number; and determine whether the second length of the second untokenized account number is the same as the expected length.

17. The system of claim 16, wherein the at least one memory and the computer program code are further configured to, with the at least one hardware processor, cause the apparatus to parse the second untokenized account number into a prefix value, middle digits value and suffix value after determining the second length is the same as the expected length.

18. The system of claim 16, wherein the at least one memory and the computer program code are further configured to, with the at least one hardware processor, cause the apparatus to remove digits from the second account number to define a new length after determining the second length of the second untokenized account number is different than the expected length.

19. The system of claim 18, wherein the at least one memory and the computer program code are further configured to, with the at least one hardware processor, cause the apparatus to parse the second untokenized account number into a prefix value, middle digits value and suffix value after determining the new length is the same as the expected length.

20. A system of claim 15, wherein the at least one memory and the computer program code are further configured to, with the at least one hardware processor, cause the apparatus to:
receive a second message, the second message comprising a tokenized account number;
search for a token pattern in the second message;
find the token pattern in the second message;
after finding the token pattern in the second message, locate the tokenized account number;
parse a token from the tokenized account number;
extract a token map identifier from the token; and
retrieve a token map based on the token map identifier.

* * * * *